(12) United States Patent
Malik et al.

(10) Patent No.: US 9,413,632 B2
(45) Date of Patent: Aug. 9, 2016

(54) METHOD FOR EXTENDED RATE/RANGE COMMUNICATION OVER A COMMUNICATION NETWORK

(71) Applicant: Entropic Communications, Inc., San Diego, CA (US)

(72) Inventors: Rahul Malik, Bangalore (IN); Vipin Aggarwal, Irvine, CA (US); Albert Garrett, Gadsen, AL (US); Etan Cohen, San Francisco, CA (US); Cimarron Mittelsteadt, Saugus, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 400 days.

(21) Appl. No.: 13/735,957

(22) Filed: Jan. 7, 2013

(65) Prior Publication Data

US 2014/0192803 A1    Jul. 10, 2014
US 2015/0381469 A9    Dec. 31, 2015

Related U.S. Application Data

(62) Division of application No. 12/245,498, filed on Oct. 3, 2008, now Pat. No. 8,351,368.

(60) Provisional application No. 60/978,012, filed on Oct. 5, 2007.

(51) Int. Cl.
*H04L 12/701*    (2013.01)
*H04L 12/28*    (2006.01)

(52) U.S. Cl.
CPC ............ *H04L 45/00* (2013.01); *H04L 12/2838* (2013.01); *H04L 2012/284* (2013.01)

(58) Field of Classification Search
CPC ..... H04J 3/0635; H04J 3/0638; H04J 3/0644; H04J 3/0658; H04J 3/0673; H04J 3/0679; H04J 3/0685; H04W 56/00; H04W 56/001; H04W 56/0015; H04W 56/002
USPC ............ 370/395.62, 464, 498, 503, 507, 509, 370/512, 537, 540
See application file for complete search history.

(56) References Cited

U.S. PATENT DOCUMENTS

| | | | |
|---|---|---|---|
| 5,452,471 A | 9/1995 | Leopold et al. | |
| 6,215,792 B1* | 4/2001 | Abi-Nassif | H04W 56/004 370/447 |
| 6,522,629 B1* | 2/2003 | Anderson, Sr. | H04L 41/022 370/236 |
| 2002/0056133 A1* | 5/2002 | Fung et al. | 725/118 |

(Continued)

FOREIGN PATENT DOCUMENTS

WO    2006020559    2/2006

*Primary Examiner* — Chi H Pham
*Assistant Examiner* — Weibin Huang
(74) *Attorney, Agent, or Firm* — McAndrews, Held & Malloy, Ltd.

(57) ABSTRACT

A technique for communicating multimedia data between nodes over coaxial cable, wherein the nodes are connected via a coaxial cable network, is disclosed. In an embodiment, the technique involves establishing a primary channel for communicating between first and second nodes of the coaxial cable network, establishing a secondary channel for communicating between the first and second nodes of the coaxial cable network, wherein the primary and secondary channels are in different frequency bands and wherein the primary channel is used for communicating media access control frames, and communicating a time series of data frames between the first and second nodes using both the primary channel and the secondary channel.

8 Claims, 13 Drawing Sheets

(56) References Cited

U.S. PATENT DOCUMENTS

| | | |
|---|---|---|
| 2002/0132629 A1 | 9/2002 | Desai |
| 2004/0163129 A1 | 8/2004 | Chapman et al. |
| 2004/0244043 A1 | 12/2004 | Lind et al. |
| 2005/0032478 A1 | 2/2005 | Stephens et al. |
| 2006/0126506 A1 | 6/2006 | Denney |
| 2006/0221883 A1 | 10/2006 | Damnjanovic et al. |
| 2007/0127468 A1* | 6/2007 | Choi ................ H04L 12/2801 370/389 |
| 2007/0201405 A1 | 8/2007 | Santhanam |
| 2008/0163024 A1 | 7/2008 | Lakkis |
| 2008/0186885 A1 | 8/2008 | Athalye et al. |
| 2008/0209489 A1 | 8/2008 | Joyce et al. |
| 2008/0273548 A1 | 11/2008 | Leano et al. |
| 2008/0298275 A1 | 12/2008 | De Sousa |
| 2009/0092154 A1* | 4/2009 | Malik ................ H04L 12/2861 370/480 |
| 2010/0329134 A1 | 12/2010 | Doppler et al. |

* cited by examiner

METHOD FOR EXTENDED RATE/RANGE COMMUNICATION OVER A COMMUNICATION NETWORK

CROSS-REFERENCE TO RELATED APPLICATION

This application is a divisional of U.S. patent application Ser. No. 12/245,498, filed on Oct. 3, 2008, which claims priority benefit to U.S. Provisional Application No. 60/978,012, filed on Oct. 5, 2007, the contents of each of which are hereby incorporated by reference as if set forth in their entireties.

BACKGROUND OF THE INVENTION

Driven by the increasing prevalence of digital content and multi-media applications, of late there has been a dramatic growth in the need for home networking. This has fuelled new development of home networking technology both wired and wireless. One such technology—the Multimedia over Coax Alliance (MoCA) V1.0 Specification (identified herein as [1]) describes the MAC and PITY layers for high-rate communications over the coaxial TV-cable plant that is present in most homes. MoCA makes use of a 256-tone OFDM based-PHY to provide for a data-rate of up to 310 Mbps at a range of up to 300 feet on a 50 MHz channel located in the 850~1500 MHz band. This translates to an effective MAC-layer throughput of 125 Mbps.

Among other enhancements, MoCA V1.1 Draft Specification (identified herein as [2]) provides for several additions to the MAC-protocol in [1] that facilitate the realization of even higher MAC-throughputs. This is achieved primarily through the use of packet aggregation which allows for the overhead involved in a transmission to be shared among several packets and results in throughputs of up to 180 Mbps.

FIG. 1 depicts a typical MoCA network 120 comprising of MoCA nodes 111 through 115 connected over segments of coax through splitters 102, 103 and 104. The network connects to the external operator network through the Multi-tap 101, with the splitter 102 constituting the root-node. Within 120, nodes 111, 112, 113, 114 and 115 may communicate with each other. When the communications path between two nodes, for instance between 111 and 112 traverses two branches of the same splitter (in this example 103), the channel is referred to as 'splitter-jumped'. Another example of 'splitter jumping' is at splitter 102 on the path between nodes 112 and 114.

While the physical MoCA network operates on a shared coax-medium, the logical network model is significantly different. Because of the effects of splitter-jumping and reflections at different terminations, the channel characteristics for a link between two nodes may be significantly different from the link between two other nodes. Channel characteristics between two nodes may also be different in the forward-path and the reverse-path. In order to maximize channel capacity, the MoCA MAC protocol defines operation of the MoCA network as a fully meshed collection of point to point links, each with its own channel characteristics and capacity. In order to effect communications, a node uses a set of optimized PHY parameters tailored to the channel characteristics between it and the destination node(s) that it wishes to communicate with. This optimal set of parameters is referred to as a 'PHY-profile' and is obtained based on a process known as 'modulation profiling' described in detail in [1].

Further, as a result of the channel being a physically shared medium, only one node may be transmitting at any given time. This is ensured by the fact that the MoCA network is a centrally coordinated system, with one of the nodes being assigned the responsibility of being the network-coordinator (NC), which in addition to transacting data on the network like existing-nodes (ENs) is also responsible for: transmitting beacons to advertise network presence and timing; coordinating the node-admission process whereby new-nodes (NNs) join the network; scheduling and coordinating the transmission of data among all nodes; and scheduling and coordinating periodic link-maintenance operations (LMOs) whereby all nodes update their PHY-profiles; among other functions, more fully described in [1] and [2].

FIG. 2 depicts the allowed frequency channels on which the MoCA-device may operate as per [1]. Literals 201 through 214, respectively define the centre frequency of different coax-channels on which a MoCA node may form a network as per [1]. All in all, there are 14-channels. These channels are enumerated as {A1, B1, C1, C2, C3, C4, D1, D2, D3, D4, D5, D6, D7, D8} respectively.

When a MoCA-node first powers up, it attempts to join an existing network by 'scanning' the frequency range 201 through 214 to detect beacons indicating the presence of a network on a given channel. Beacons are transmitted using a special PHY-profile referred to as 'Diversity-Mode' which is known a-priori to all nodes, hence allowing the beacon to be deciphered prior to performing modulation-profiling, which is performed as a part of the node-admission sequence. Diversity-Mode transmissions are additionally robust yielding the highest range of transmission on the MoCA network, albeit at a lower data rate, facilitating easy network detection by all nodes.

On detecting a beacon, the node synchronizes itself to the network-time, information of which is contained in the beacon. This is followed by the transmission of an admission-request and the execution of the rest of the node-admission process, as described in [1]. During node-admission, the NC schedules the creation of PHY-profiles and the exchange of transmit-power and capability-information between all the nodes in the network. Once a node is admitted on to the network, its classification changes from NN to EN and it starts to receive its schedule information through the MAP-frame (Media Access Plan) the pointer to which is initially conveyed through means of the beacon.

In the event that a node does not detect the presence of another network as part of its frequency scan, it assumes the role of the NC and starts to transmit beacons of its own for a short duration on each channel before switching to another channel. Thus several MoCA nodes scanning the network would eventually detect each other and form a network with one of them being the NC.

The standard [1] describes a frequency scan pattern and protocol which minimizes the chance of network-fragmentation—i.e. when some nodes form a network on one channel and others on another channel(s), rather than all on the same channel. Alternately, the standard [1] also allows for devices to be configurable such that their frequency-scan is limited to a subset of channels 201 through 214.

Additionally, the standard [1] defines the concept of 'taboo-channels' which are channels on which if transmissions occur, devices in existing network may suffer from impaired operation. The NC broadcasts its taboo-channel information in its beacon, informing other nodes not to form-a-network/transmit-on-the-taboo-channel. Likewise, NNs joining a network have their own taboo-channel information, which they inform the NC of via means of their admission request frame. The NC continually updates its taboo channel information with the union of the taboo-channel information of all nodes that attempt to join the network, thereby ensuring that a device that has received a beacon from the NC would not attempt to transmit on any of the channels that are taboo for any of the nodes in the network.

Within the network, data transmission between nodes is scheduled through means of a Media Access Plan (MAP)-cycle. Each MAP-cycle is described by means of a MAP-frame that is transmitted by the NC in the previous MAP-cycle. The MAP-frame is used to primarily convey information about the upcoming transmissions on the medium, link-state of the network, LMO operations and privacy encryption keys in effect for the duration specified in the MAP. In order to improve bandwidth efficiency on the network, the MAP-frame is transmitted using the NC's 'MAP-Profile' which is the greatest common denominator (GCD) of all the profiles between the NC and all ENs, hard-limited to 64QAM and is expected to yield a PHY-data-rate greater than that of the Diversity-Mode profile. As the GCD-profile is derived from the PHY-profiles of the NC to the individual nodes (ENs) it can be received by each node in the network.

FIG. 3 represents the timing relations of the MAP-frame. As can be seen from the figure, each MAP-cycle is defined by a MAP-frame—311, 312 and 313, respectively occurring in the previous MAP-cycle 301, 302 and 303, respectively. The beacon 321 contains pointers to the Admission Control Frame (ACF) 322 as well as to the next-beacon 323 in order to facilitate node-admission for a NN. It also contains pointers to the next MAP-frame 312 which can be used by an NN which is completing node-admission and transitioning to an EN.

The MAP-frame represents the scheduling-unit for traffic on a network. The NC schedules reservation-request (RR) transmission-opportunities for different nodes by which they may make a request to transmit data in the next MAP-cycle. A single RR-frame may carry requests for multiple data units. Based on the RR-frames 331 and 332, the NC generates the MAP-frame 311 which defines the schedule of transmission in MAP-cycle 302. It may be noted that subject to bandwidth availability, the NC may accept or deny a node's reservation-requests. As can be seen from the figure, in addition to scheduling the transmissions requested by the RR-frames i.e. 341 and 342, the NC also schedules control-frames such as Beacon 321, RR-Z 333, ACF 322 and MAP-frame 312 in MAP-cycle 302.

In order to define minimum requirements for MoCA implementations, [1] prescribes time constraint $T_{RM}$ 351 which represents the minimum duration from the last RR of the current MAP-cycle to the MAP-frame defining the next MAP-cycle. This represents the amount of time the NC has available to it to compute the schedule for the next MAP-cycle. [1] also defines time-constraint $T_{MR}$ 352 which represents the minimum amount of time that ENs have to interpret the MAP-frame 312 and schedule their transmissions and receptions in the next MAP-cycle.

SUMMARY

Deficiencies in the prior systems are addressed by the present invention. Embodiments include a method augmenting communications on a primary channel through means of additional secondary channels for the purposes of increasing overall data-rate, enhancing reliability, reducing transmit power and extending range, such method comprising the steps of configuring EMoCA capable nodes to use the secondary channels; marking the configured secondary channels in a list of unusable channels with the purpose of signaling legacy-nodes not capable of EMoCA communications to avoid transmission on unusable channels; signaling by the configured nodes, via the network controller of their capability to use secondary channels; determining by EMoCA capable nodes through broadcast of capability information by the network controller and utilizing the maximal set of common secondary channels when communicating with other such nodes; receiving by EMoCA capable nodes all scheduling information via the schedule broadcast by the network controller on the primary channel; determining by EMoCA capable nodes transmission parameters for use on the secondary channels as per the methods adopted on the primary channel and transmitting similar channel sounding packets on the secondary channels; receiving by EMoCA capable nodes, channel sounding packets, processing them and transmitting their response via the primary channel; realizing by the EMoCA capable nodes optimal channel utilization by maintaining equal time occupancy on primary and secondary channels; transmitting by the EMoCA capable nodes at high data rates by splitting a payload to occupy the minimum number of transmission symbols across both primary and secondary channels; realizing by the EMoCA capable nodes high reliability transmission by replicating a payload on both primary and secondary channels; realizing by the EMoCA capable nodes high reliability transmission by repeating the payload by a factor prior to splitting it across primary and secondary channels as per the embodiments of the present invention; and realizing by the EMoCA capable nodes high reliability, low transmit power and extended range transmissions by reducing the constellation order in transmissions. Additionally, the configuring step may also be based on a previously-determined and commonly-known relationship of the secondary channel with respect to the primary channel.

Legacy nodes may be prevented from accessing a secondary channel by an EMoCA node marking the secondary channel as an unusable channel in its list of unusable channels; communicating its list of unusable channels to the network controller; and having the network controller periodically broadcast the union of the set of all unusable channels as told to it by nodes requesting the network controller access to the network, with the legacy nodes receiving this broadcast from the network avoiding accessing any unusable channel.

The new-node step of signaling the secondary channel capability to other nodes can comprise setting predetermined and commonly known bits corresponding to the secondary channels to be used, in a field of the admission request sent to the network controller as part of admission to the network; broadcasting by the network controller this field to all existing nodes in the network; inferring by the existing EMoCA nodes the secondary channels to be used while communicating with new-node, from the bits set in this field.

The node's step of signaling the secondary channel capability to other nodes by executing a frame exchange sequence with other nodes in the network via the network controller after joining the network, the frame exchange sequence can comprise the joining node signaling the network controller of its secondary channel capability; responding by the network controller with the secondary channels in use by the network; and signaling by the network controller other nodes of the joining node's secondary channels.

The node's step of receiving all schedule information of the secondary channels via the primary channel, can comprise determining transmissions and receptions from said schedule as utilizing the maximal set of common secondary channels between transmitting and receiving node; and scheduling primary and secondary transmitters and receivers for an equal duration of time, at the appropriate instant of time and configuring them to use the respective transceiver parameter sets as determined from said schedule.

Other variants include the method of performing open-loop transmit power control on the secondary channel as a step towards determining the transmission parameters to be used. This method can comprise transmitting by a node the initial-power control request frame on the secondary channels in addition to the primary channel, at the time determined from the schedule received on the primary channel; responding by the recipient of the initial power control request, with the appropriate power control response, the response of the secondary channels being appended to the power control response of the primary channel, said concatenated power control response being transmitted on the primary channel; and acknowledging by the recipient the response, the acknowledgement of the secondary channels being appended to the acknowledgement of the primary channel, said concatenated acknowledgement being transmitted on the primary channel.

In another variant, the step of characterizing the secondary channels as a step towards determining the transmission parameters can comprise the steps of transmitting probe frames on the secondary channel as well, based on the schedule applicable to the primary channel as received on the primary channel; and nodes receiving the probe frames responding with the appropriate probe response, the response of the secondary channels being appended to the response of the primary channel, said concatenated response being transmitted on the primary channel. Still, the step of adjusting the transmission power as a step towards optimizing the determined transmission parameters used on the secondary channels, involving the concatenation of power adjustment factors of the secondary channels to the power control factor of the primary channel, said concatenated response being transmitted on the primary channel. Furthermore, the step of maintaining equal time occupancy on both primary and secondary channels can comprise the utilization by the transmission-symbols of both primary and secondary channels equal guard durations; the utilization by the transmission waveforms of both primary and secondary channels the same preamble type; and the utilization of transmission waveforms of both primary and secondary channels an equal number of transmission-symbols.

In still another variant the step of transmitting a payload at high data rates can comprise determining the minimum number of transmission symbols required to accommodate the payload based on the combined channel capacities and transmission parameters of the primary and secondary channels; determining the size of the pad required to partition the payload into primary and secondary fragments; encoding the transmission scheme in use in the header of the secondary fragment; transmitting said fragments on their respective channels using their respective set of transmission parameters. The step of transmitting a payload using a high-reliability transmission scheme can comprise determining the maximum number of transmission symbols required to accommodate the payload on either primary or secondary channels, using the transmission parameters of both primary and secondary channels; determining the size of the pad required on the channel with lower transmission capacity so as to realize an equivalent number of transmission symbols as claimed above; encoding the transmission scheme in use in the header of the secondary fragment; and transmitting said fragments on their respective channels using their respective set of transmission parameters. The step of transmitting a payload using a high reliability transmission scheme can comprise repeating the payload by a predetermined factor to constitute a repeated payload for transmission; determining the minimum number of transmission symbols required to accommodate the repeated-payload based on the combined channel capacities and transmission parameters of the primary and secondary channels; determining the size of the pad required to partition the payload into primary and secondary fragments; encoding the transmission scheme in use in the header of the secondary fragment; transmitting said fragments on their respective channels using their respective set of transmission parameters. In another variant, the step of transmitting a payload using low transmit-power, extended range and enhanced reliability can comprise signaling by a node the transmission parameter set, the order of constellation reduction and the transmission time computed based on the above, to the network controller in order to request a transmission opportunity for a frame; broadcasting by the network controller a schedule comprising of said transmission opportunity, the schedule further indicating the transmission parameter set and constellation order reduction to be used; transmitting by the transmitter the payload in accordance with schedule and parameters determined from the network controller's broadcast; and receiving by the receiver the transmission as per said schedule, and demodulating it using the transmit parameters and constellation reduction determined from the network controller's broadcast.

In further variants, the step of receiving a payload transmitted can comprise determining the number of transmission symbols to receive on primary and secondary channels from the duration of the reception based on the schedule information received on the primary channel; demodulating the fragments in accordance with the parameters used for their transmission as determined from the schedule information broadcast received from the network controller on the primary channel; and determining the reception scheme to be used based on the transmission scheme adopted and encoded in the secondary fragment's header by the transmitter. The step of recovering the payload transmitted using fragments received can comprise concatenating secondary fragment to primary fragment provided the checksum of both fragments is determined as valid; else declaring the reception to be in error. This step of recovering can also comprise selecting the primary or secondary received fragment depending on the fragment whose checksum is determined to be valid; declaring the reception to be in error if neither checksum is valid. This step can also comprise concatenating the secondary received fragment to the primary fragment; performing a bit-wise majority selection over the constituent payload-repetitions to determine the transmitted payload.

In addition to the method and variants thereof, embodiments of the present invention further includes apparatuses for augmenting communications on a primary channel through the use of additional secondary channels for the purposes of increasing overall data-rate, enhancing reliability, reducing transmit power and extending range. The apparatus can comprise an application processor capable of either exposing a generic network interface to an external device or serving as a source or sink for data to be transacted over the communications network; a media access control processor capable of independently and simultaneously controlling the primary and secondary channel physical layer processors; a memory unit used for storing packets; a primary physical-layer processor capable of transmitting and receiving a bit stream from the media access control processor an appropriate intermediate signal-type as input to a front-end device; a plurality of secondary physical-layer processors capable of transmitting and receiving a bit stream from the media access control processor an appropriate intermediate signal-type as input to a front-end device; a plurality of front-end devices each connected to its respective physical-layer processor, each capable of translating the intermediate signal-type of the physical-layer processor to the modulated waveform at the appropriate channel frequency, to be transmitted on the channel medium; a combining device capable of combining the outputs of the front-end devices into a single network interface; and a common clock source generating the clocks to the claimed media access control processor, physical-layer processors and front-end devices.

Another embodiment of the apparatus can comprise a plurality of devices each capable of communications over a single communications channel, inter-connected in a manner, such that a device designated as primary interfaces to an application processor via one interface and to devices designated as secondary via another interface; network outputs of primary and secondary devices being interfaced to the network media by means of a combiner; primary and secondary devices deriving their clocks from the same reference source. The primary and secondary devices can be synchronized by performing the steps of polling by the primary device the status of the phase-locked loop of the secondary device via means of an inter-device interface; writing by the primary device, on determining the phase-locked loop of all primary and secondary devices as locked, a synchronization word to its own time-counter as well as to the time counters of the secondary devices over an inter-device interface, the synchronization word written to the secondary devices accounting for a pre-determined latency difference between the primary device accessing its internal time-counter and the primary device accessing the time-counter of the secondary devices over the inter-device interface. This apparatus can also be booted by having the primary device perform the steps of accessing the firmware image from an external source and storing it in memory; transferring the boot-code to the secondary devices via the inter-device interface; and signaling the secondary devices on completion of the transfer of boot-code via the inter-device interface. Furthermore, the apparatus can utilize the asymmetry between primary and secondary devices to realize a reduction in overall power consumption by selectively disabling unused components on either device. This asymmetry can further be exploited by reducing the operating frequency of internal sub-modules of the component devices as a function of processing load.

The preceding apparatus can also transmit a packet using both primary and secondary channels by having the primary device performing the steps of receiving the payload to be transmitted from the application processor; conditionally on the transmission scheme in use, determining the primary and secondary fragments to be transmitted on the primary and secondary channels respectively; sending a reservation request to the network coordinator for the determined transmission; transmitting the secondary fragments transmit-information to the secondary devices over the inter-device interface; and on receiving the schedule information from the network controller, forwarding said schedule information to the secondary devices over the inter-device interface; and by both the primary and secondary devices decoding the schedule information and transmitting their respective primary and secondary fragments over the network media through means of the combiner. Furthermore, the secondary channels transmit information transmitted by the primary device to the secondary devices prior to a frame transmission can comprise tag information by which a secondary device may associate said secondary channel transmit information to the schedule received from the primary device via inter-device interface; transmit parameters to be used for transmission of associated fragment; fragment to be transmitted on secondary channel; and pad information to be transmitted on said secondary channel.

The apparatus can also receive a packet over both primary and secondary channels by forwarding by the primary device the schedule information to the secondary devices via the inter-device interface, on receiving schedule information broadcast by the network controller; receiving by both primary and secondary devices their respective primary and secondary fragments over their respective primary and secondary channels in accordance with the schedule received by the primary device and forwarded to the secondary devices; transmitting by the secondary devices fragment receive-information to the primary device; determining by the primary device the transmission scheme used and appropriately combining the secondary payload fragments with the primary payload fragment as per the embodiments described herein to determine the originally transmitted payload; and transmitting by the primary device the payload to the application processor via the appropriate interface. Furthermore, the secondary channel receive information transmitted by the secondary devices to the primary device after receiving a secondary fragment can comprise tag information by which the primary device may associate said secondary channel receive information to the schedule received from the network coordinator and the primary fragment as received by the primary device; payload of fragment received over the secondary channel; secondary fragment reception status; transmission scheme used by transmitter to transmit packet, as determined from secondary fragment header.

The apparatus can resynchronize the system-timers of the primary and secondary devices with respect to the system-time determined from a frame received from the network controller by having the primary device determine the offset of its local system-timer with respect to a transmission received from the NC by comparing the time-stamp of its reception with the network controller's system time contained in a frame received from the network controller; determine a safe-instant to apply offset, such safe instant corresponding to no scheduled transmit/receive activity for the node as determined from the schedule received from the network coordinator over the primary channel; transmit the determined offset as well as safe-instant as determined above, to the secondary devices via an inter-chip interface; and by having both primary device and secondary devices apply the determined offset to their respective time-counters at determined safe-instant.

Furthermore, embodiments also include systems comprising the apparatuses described above along with devices employed the methods described.

DESCRIPTION OF FIGURES

Features, aspects, and embodiments of the inventions are described in conjunction with the attached drawings, in which.

DETAILED DESCRIPTION

While originally conceived to service the needs of home networking taking advantage of the installed coax cable plant to distribute local-area-network (LAN) content within the home, MoCA has also been extended to several other applications. In a multi-dwelling unit (MDU) it has been envisioned that MoCA could be used as a point-to-multi-point means of distributing wide-area-network (WAN) content that arrives to the building over an optical-link to multiple tenants, exploiting the installed coaxial cable in the building. In another application scenario it is intended that MoCA be used to carry the WAN content from a curb-side optical network termination to an individual residence in a point-to-point configuration. These applications impose different rate/range performance requirements on the technology.

The systems, methods and apparatus embodied in following disclosure are collectively referred to as 'Enhanced-MoCA' or EMoCA, as well as all enhancements and variations which would be apparent to one of ordinary skill in the art. EMoCA relates to how nodes, may extend their rate and/or range of communication over 'legacy-nodes' or 'MoCA-nodes,' which are nodes specified by either standard described in [1] or [2]. EMoCA nodes should be fully interoperable and compatible with legacy-nodes, realizing enhanced rate and/or range performance while communicating with other EMoCA nodes. EMoCA nodes should also realize the performance expected of legacy-MoCA devices while communicating with legacy MoCA-nodes. Also, the operation of EMoCA is agnostic to an EMoCA-node being the NC in the network. In other words EMoCA allows for complete coexistence with legacy-MoCA.

Further, the embodiments of the present invention also realize an EMoCA-node based on the reuse of parts and components used in the construction of a legacy MoCA-nodes, making EMoCA particularly suited as a low-cost, high-value upgrade to MoCA.

Figure 1:
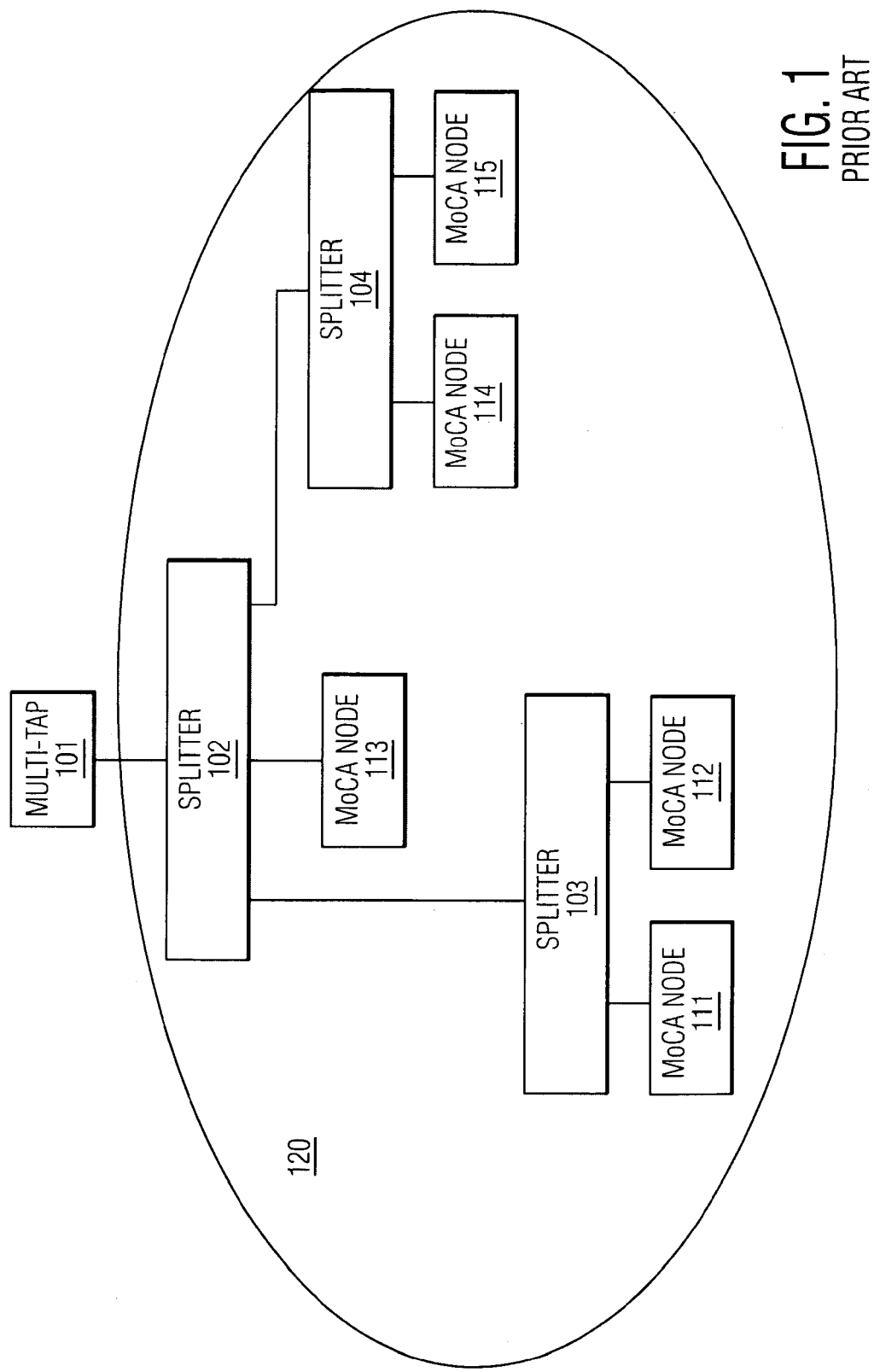
FIG. 1 (Prior-art) depicts a typical MoCA network constituted of a plurality of MoCA nodes connected via segments of coax cable and splitters.
Figure 2:
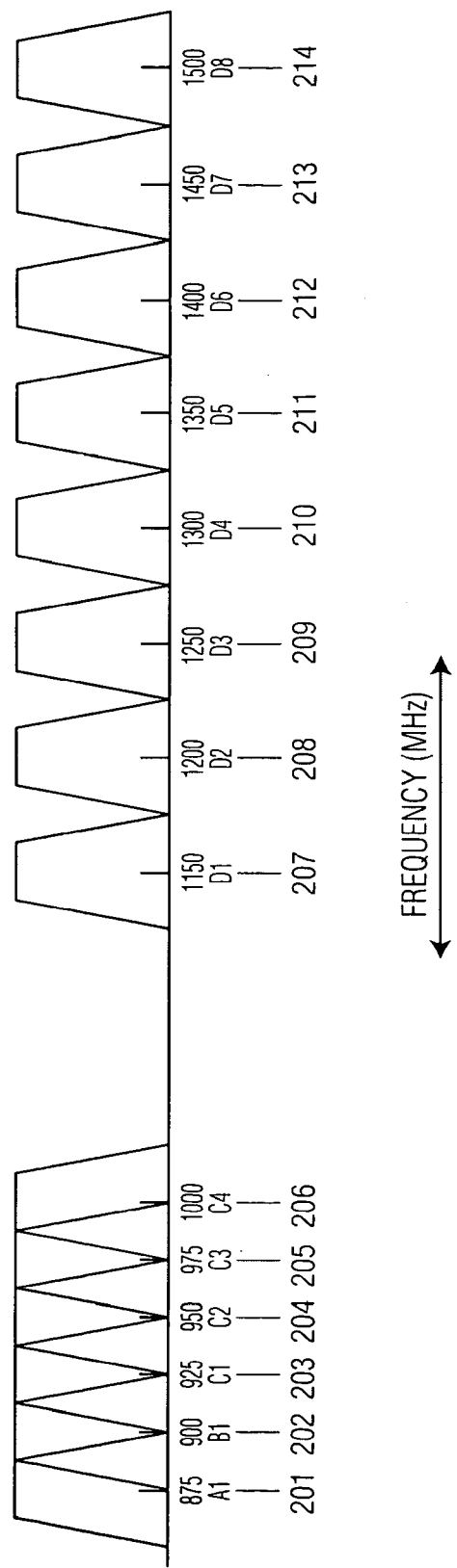
FIG. 2 (Prior-art) depicts the RF-spectrum allowed for MoCA use as per the teachings of [1]
Figure 3:
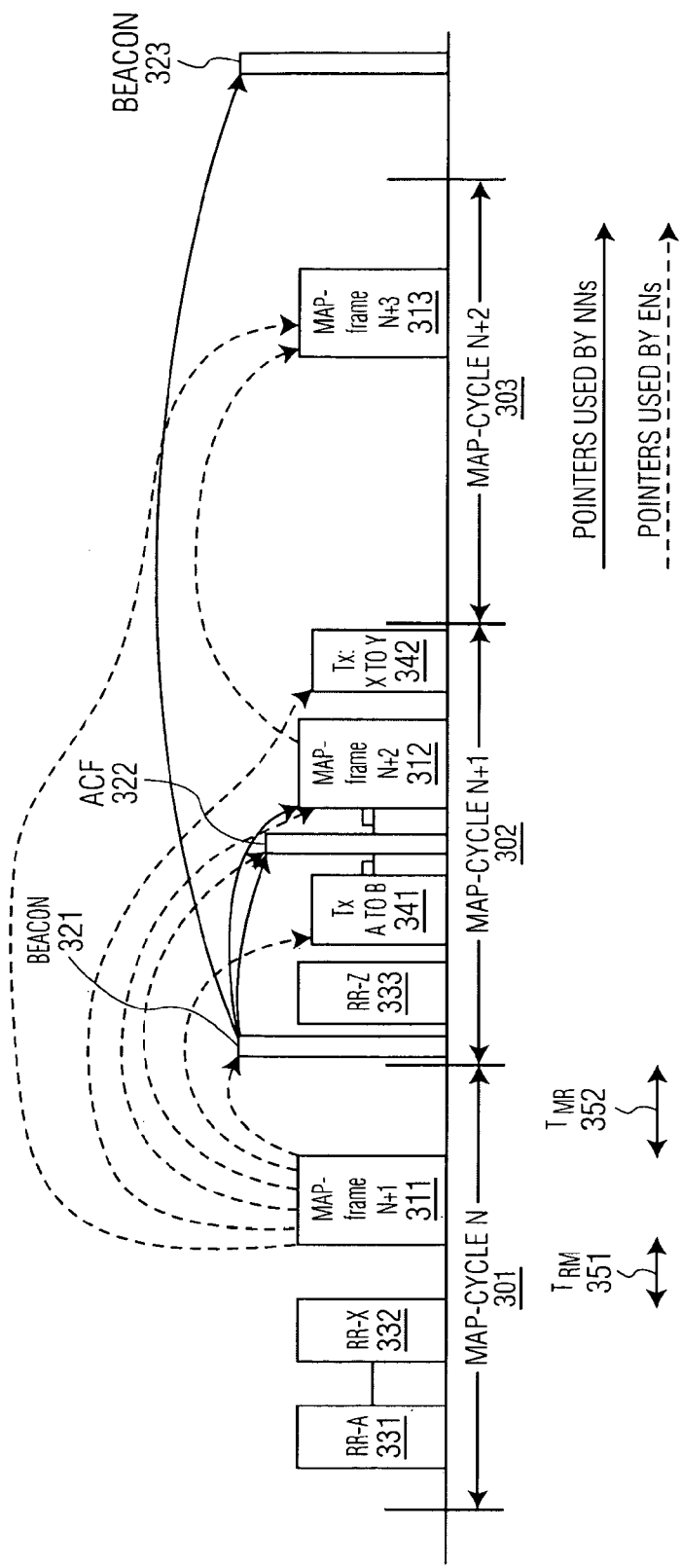
FIG. 3 (Prior-art) depicts a typical set of MAP-cycles in the context of network with MoCA devices.

The benefits of EMoCA are primarily realized through a mechanism known as channel-bonding wherein EMoCA devices make use of a plurality of non-overlapping MoCA channels from the allowed spectrum depicted in FIG. 2 to communicate with one-another. One of the channels is referred to as the 'Primary-channel' while the other(s) are referred to as 'Secondary-channel(s)'. The primary-channel hosts the legacy MoCA-nodes and is used by the NC to transmit control information such as beacons and MAP-frames, as well as data transmissions between nodes on the network. EMoCA nodes when transmitting to compatible EMoCA node(s) may augment their transmission through the use of the secondary channel(s) using the increased bandwidth for realizing one or a combination of the following benefits improving rate and/or range: (1) Additional Bandwidth for higher aggregate throughput through channel-multiplexing; (2) Frequency-diversity for robust transmission; and (3) Reduced constellation-order for reduced transmit power/enhanced range operation.

For simplicity sake, in the ensuing description unless otherwise specified, EMoCA shall be described in the context of a network with a single Primary-channel and a single Secondary-channel. However, as would be apparent to one skilled in the art, embodiments of the present invention would be just as applicable to a network of nodes with multiple secondary channels as well.

According to an aspect of an embodiment, an EMoCA-node signals channels that it would use as 'Secondary-Channels' as taboo-channels in its beacon or Admission-request frame—depending on whether it is the NC or the EN. This prevents MoCA-nodes that receive a beacon from an EMoCA network from attempting to set up a network on an EMoCA secondary-channel.

In terms of the nodes on the network, (E)MoCA networks are expected to be relatively static in nature—(1) in the multi-dwelling unit (MDU) deployment, the network would be managed by the WAN provider; (2) in the ONT deployment, the network is expected to be managed by the WAN-provider; (3) in the home-network deployment, the network is expected to be managed by either the Service-provider or the end-user in the house.

It is expected that EMoCA devices would provide configurability for instance through means of an application-programmable-interface (API), or otherwise by which the end-user/network-administrator would be able to define the secondary channel to be used for EMoCA communications and correspondingly edit the taboo channel-list of the node. In one mode of operation, EMoCA nodes would use a specific (configurable) channel as the secondary channel, this channel being configured as taboo on all nodes in the network.

In a mode of operation, the secondary channel would be definable in terms of an offset or a relation with respect to the primary-channel. An EMoCA network implementing this means of deriving the secondary-channel would perform a frequency scan as would a legacy MoCA-node and on joining/forming a network on a particular channel would be able to infer the secondary channel to use via a relation common to all EMoCA-nodes on the network. For example, EMoCA nodes using the relation: "Secondary channel would be the nearest channel 100 MHz to the right of the primary channel", would determine the secondary channel to be 210 if the primary channel was 207; 201 if the primary channel was either 213 or 214.

As per [1], during node admission, an NN sends an Admission Request to the NC. The NC may either reject the request by ignoring it; or accept the request through the Admission Response frame that is broadcast in diversity mode. The Admission Response frame contains a reiteration of the NODE_PROTOCOL_SUPPORT field as well as the NODE_GUID fields of every node (including the NC) in the network that are repeated as was received by the NC during the node admission of each respective node. Also, as per [1], the first 48 bits of the GUID represent the globally unique Ethernet MAC address of the node. The later 16-bits are Reserved and are set to 0x0000.

According to a mode of operation, an EMoCA NN signals the number and the position of the secondary channels it is able to (simultaneously) use in a 14-bit 'Secondary-channel bit-map' that occupies the lower 16-bits of the GUID field in the Admission Request frame. In the admission response frame, the NC broadcasts the GUIDs of all nodes in the network. Thus, all EMoCA nodes interpret the reserved field of the GUID in the Admission Response frame and are aware of the secondary channels to be used while transmitting to an EMoCA node on the network.

Figure 4:
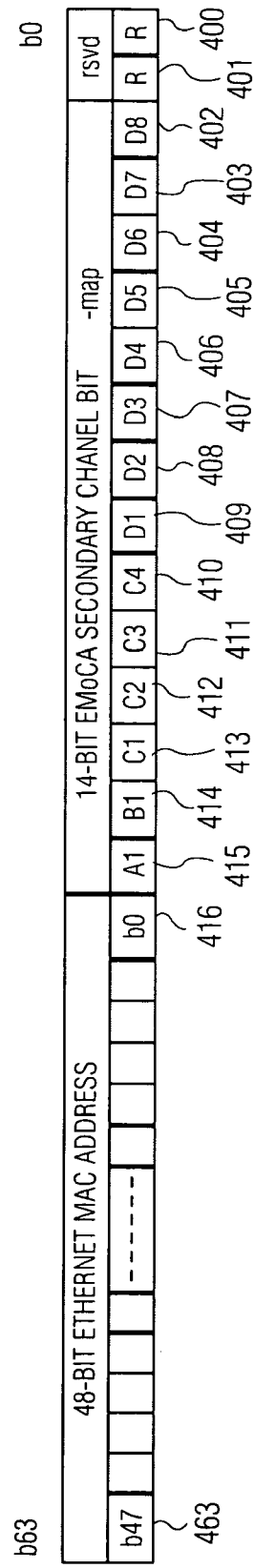
FIG. 4 depicts the secondary channel bit-map as per an embodiment of the present invention.

FIG. 4 depicts the 64-bit GUID field that is transmitted by EMoCA nodes as part of their admission request frame. As in the case of legacy-nodes bits 463 through 416 represent the globally unique Ethernet MAC-ID of the device. Bits 415 through 402 represent the 14-bit EMoCA secondary channel bit map, with 415 representing channel A1 i.e. 201; and 402 representing channel D8 i.e. 214. Bits 401 and 400 are reserved for future use.

The signaling of the Secondary-channel bit-map may also be done via the NODE_PROTOCOL_SUPPORT field which is treated similarly to the NODE_GUID field by the NC, during the node-admission process.

According to a further mode of operation, nodes would be able to negotiate the secondary channel to use after joining the network by signaling over the primary-channel. Such communication to negotiate the channel to be used could be facilitated by use of the L2ME-protocol described in [2]; or through means of a proprietary upper-layer protocol signaled via the primary channel and lying above the MAC-sub-layer of the MoCA protocol described in [1] and [2]. This mode of operation is further applicable to future enhancements to the MoCA specification [1], which may allow for a larger list of available channels than can be accommodated in the signaling scheme depicted in FIG. 4.

According to another mode of operation, it is conceivable that nodes would determine the secondary channel to use after joining the network on the primary channel. The secondary channel to be used could be decided based on scanning the frequency spectrum and characterizing available channels for, among other metrics as apparent to one skilled in the art: (1) noise-floor measurements; and (2) channel profiling between nodes to determine the secondary channel that yields the highest channel-capacity thereby improving aggregate throughput.

Thus as per the above description, while EMoCA devices may have different capabilities, distinguished by the number of secondary channels that they can simultaneously support in addition to the primary channel, the location of the secondary channel is common to all devices that support it. As an example, consider a network with a mix of two and three-channel capable EMoCA devices. Devices A and B support one secondary-channel while devices C and D support two secondary channels. Devices A and B would have a common secondary-channel bit-map as depicted in FIG. 4 with one of the bits 415 through 402 set. Devices C and D would have a mutually-same secondary channel bit-map which would be the super-set encompassing the secondary channel bit-map of devices A and B, as well as one other bit 415 through 402.

EMoCA nodes employ the primary-channel for transmission of all MAC PDUs (ie Data and Control-frames), Beacons and Probes as do legacy MoCA-nodes, employing the secondary channel for augmenting data transmissions to EMoCA nodes. In addition to using the secondary-channel for augmenting the data transmission of the primary channel, EMoCA nodes may also transmit power-control messages and probes as required to facilitate the profiling and consequently the use of the secondary channel.

In another aspect, an EMoCA node that is the NC also transmits beacons on both primary and secondary channels as per the schedule indicated in the MAP-frame received by the primary channel. This facilitates EMoCA NNs in making power-measurements that are required during the initial transmit power control phase of the node-admission sequence. As per yet another aspect, the beacon transmitted on the secondary channel would have its ACF_TYPE field set to 'No ACF' as specified in [1], thus further preventing any other node from attempting to join/form a network on a secondary channel adopted by the EMoCA network.

Thus as per the above description, all schedule related information such as Reservation Requests and MAP-frames, which are common to both primary and secondary channels are transmitted on the primary channel. The secondary channel is used to transmit channel-specific information specifically—power-control, probes and loop-back transmissions that are required to facilitate operation of the secondary channel, in accordance with the timing specified by the MAP-frame received on the primary channel.

Figure 5:
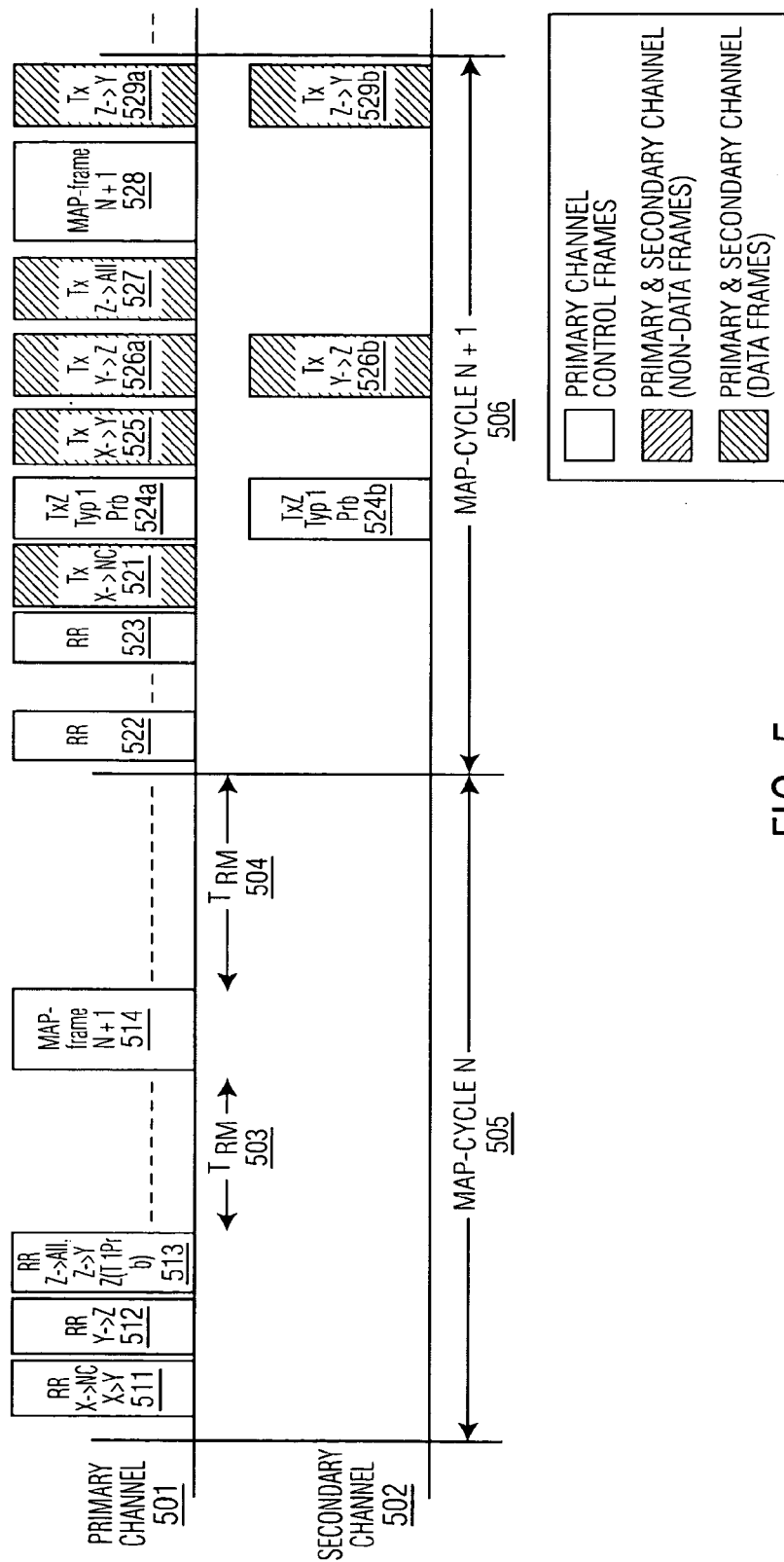
FIG. 5 depicts a typical set of MAP-cycles in the context of a network with EMoCA and MoCA devices.

FIG. 5 illustrates an exemplary representation of channel utilization of the network with respect to time. In the example, the NC and EN-X are legacy MoCA nodes, while EN-Y and EN-Z are EMoCA devices. Literal 501 marks the Primary-channel while literal 502, the secondary channel. 511, 512 and 513 mark reservation requests sent by nodes X, Y and Z in MAP-cycle N 505, which results in the NC transmitting MAP-frame N+1 514 which scheduled activity in MAP-cycle N+1 506.

As can be seen from the figure, control frames that relate to channel scheduling—511, 512, 513, 514, 522, 523 and 528, are transmitted on the primary channel 501. Data-frames that are destined to legacy MoCA-nodes—521, 525 and 527, are transmitted on the primary channel 501. Data-frames that originate from and are destined to EMoCA nodes—(526a, 526b), (529a, 529b) are transmitted using both the primary-channel 501 and the secondary channel 502. Transmission on both EMoCA channels follows the schedule published by the MAP-frame received on the primary-channel. Also, channel-specific information such as probes 524a and 524b that are used to characterize the channel (and hence are channel dependent) are transmitted on both channels 501 and 502 respectively.

In order to facilitate the usage of the secondary channel, the front-end device of the secondary channel may also need to be calibrated. Additionally, the secondary channel needs to be profiled to determine the transmit power-level, modulation-profile as well as the cyclic prefix length to be used. As calibration is implementation specific and is intrinsic to the device itself, EMoCA devices should appropriately calibrate their secondary channel front-ends, as they would their primary channel front-ends.

During the node-admission process and subsequently during the LMO, MoCA nodes are required to transmit as well as process transmissions of the type 'Probe' as described in [1]. EMoCA nodes transmit (and receive) Probes on all active channels—primary and secondary, as scheduled by the MAP-frame 514 received on the primary channel 501. As per [1], nodes that have received a transmission of the type 'Probe' are expected to generate responses called 'Probe Reports' and send them to the originator of the probe. Also as per [1], depending on the link being profiled and the 'link-state' of the node, these responses may be relayed through the NC.

Likewise, as per [1], during the node-admission sequence, MoCA-nodes need to additionally transmit and receive frames of type 'power-control'. EMoCA nodes transmit (and receive) Power-Control frames on all active channels—primary and secondary, as scheduled by the MAP-frame 514 received on the primary channel 501. Further, as per [1], nodes that have received a transmission of the type 'Power Control' are expected to generate responses called 'Power Control Response' describing the TX_POWER_ADJUSTMENT on the given channel. The originator of the 'Power Control' frame is expected to further respond with the 'Power Control Acknowledgement' frame indicating the MAX_TPC_ADJUSTMENT that the node is capable of on the given channel.

Additionally, EMoCA nodes implementing the optional 'Inner-loop Power Control', need to periodically transmit the 'Power Control Update' frame as defined in [1].

According to another aspect, an EMoCA node transmits its secondary-channel probe-reports and power-control response/acknowledgement/update information over the primary channel, by appending to the information contained in probe-report/power-control response/acknowledgement/update frames of the primary channel. As per [1], the Control Frame has a generic structure:

```
MoCAControlFrame :=
{
    MAC Header
    Frame Payload
    Payload CRC
}
```

In the context of EMoCA Control Frames transmitted on the Primary Channel this is expanded to include a 'Frame Payload (secondary channel extension)' field: EMoCAControlFrame:=

```
{
MAC header (with length encompassing the Frame Payload Secondary-channel extension)
Frame Payload (as per [1])
Frame Payload (secondary channel extension)
Payload CRC (as per [1])
}
```

Considering the example of the Type-1 Probe Report format described in [1], where among other fields fully specified in [1], the 'Frame Payload' field describes the NUM_ELEMENTS parameter which is set to 1 for a unicast report; and 2 for Async-MAP and BBL report. An EMoCA-node shall overload the Type-1 Probe Report using it to convey the secondary-channels' information in the 'Frame Payload (secondary channel extension)' which is appended to the 'Frame Payload' field that describes the primary channel information. In the context of an EMoCA Type-1 Probe Report, the NUM_ELEMENTS parameter in the 'Frame Payload' field shall additionally signal the interpretation of the 'Frame Payload (secondary channel extension)' with NUM_ELEMENTS being 1 denoting a 'unicast-report' and NUM_ELEMENTS being 2 denoting a 'BBL-report' of the secondary channel.

In the case of a Type-1 Probe Report, the Frame-Payload Secondary Channel Extension contains the following fields:

```
Type-1 Probe Report Frame Payload (secondary channel extension) :=
{
    PHY PROFILE
    PREAMBLE TYPE
    CHANNEL_USABLE
    MAX_BINS
    NUM_OF_SYMS
    BITS_PER_ACMT_SYMBOL
    CP_LENGTH
```

-continued

```
    GCD_BITMASK
    TPC_BACKOFF_MAJOR
    TPC_BACKOFF_MINOR
    for j=0;j<256;j++{
        SC_MOD
    }
}
```

Likewise, the Frame Payload (secondary channel extension) for the Type-2 and Type-3 probe-reports are as enumerated below:

```
Type-2 Probe Report Frame Payload (secondary channel extension) :=
{
    CP_LENGTH
    NUM_OF_PKTS
    NUM_OF_SYMS
    BIN_1
    BIN_2
    PROBE_STATUS
}
Type-3 Probe Report Frame Payload (secondary channel extension) :=
{
    CP_LENGTH
}
```

Likewise, the Frame-payload (secondary channel extension) of the Power-Control Response, Power-Control Acknowledgement and Power-Control Update frames are as enumerated below:

```
Power Control Response Frame Payload (secondary channel extension):=
{
    TX_PWR_ADJUSTMENT
}
Power Control Acknowledgment (secondary channel extension) :=
{
    MAX_TPC_ADJUSTMENT
}
Power Control Update (secondary channel extension) :=
{
    DELTA_BACKOFF_ADJUSTMENT
}
```

It would be apparent to one skilled in the art that in the context of an EMoCA system, some of the parameters of the Frame-payload (secondary channel extension) may be inferred from the Frame-Payload field enumerated in [1]. It is recognized that these may not be transmitted as part of the Frame-payload (secondary channel extension) and such variants of the frame format are considered to be within the present scope.

Legacy MoCA-nodes receiving EMoCA Control Frames as per the embodiment above would on determining a valid Payload CRC, decode the 'Frame-Payload' field required for legacy MoCA operation, ignoring the 'Frame-Payload (secondary channel extension)' that is defined for EMoCA operation, thereby ensuring interoperability.

EMoCA-nodes rely on the MAP-frame received on the primary channel to coordinate transmission on the primary and secondary channels. Critical to realizing efficient use of the medium via EMoCA would be to split the transmission across primary and secondary channels in a manner that facilitates synchronous transmission and equal time occupancy on each channel. This also serves to minimize adjacent channel interference variation during reception of the packet on any given channel—primary or secondary.

As a step towards achieving this goal, an aspect of the present embodiment calls for EMoCA nodes to use the maximum of the CP_LENGTH field as estimated across the primary and secondary channels and conveyed by the Type-3 Probe exchange sequence. This results in both primary and secondary channels having the same OFDM-symbol length.

A further aspect calls for both primary and secondary channels to use the same preamble-type for data transmissions as determined as part of the probe transmissions on the primary and secondary channels.

As per a still further aspect, non-data transmissions (such as probes) that are transmitted on both primary as well as secondary channels use a set of parameters on both channels that result in equal transmission lengths.

In order to realize high-data rates using EMoCA, data-packets are split across primary and secondary channels so as to result in an equal number of OFDM symbols (and consequently an equal duration of transmission). As an example, consider a data-frame of M-Bytes. In a mode of operation, an EMoCA node may utilize an iterative method as described in the following to split the data-frame into an Mp Byte fragment for transmission on the primary-channel and an Ms Byte fragment for transmission on the secondary-channel, as depicted in FIG. 6a.

First, the minimum number of OFDM symbols to be transmitted Nas is determined as in equation (2), based on the total number of Bytes to be transmitted Mt in equation (1):

$$Mt = M + 2*(LH + LCRC) \quad (1)$$

$$Nas = floor(Mt*8/(Nbasp + Nbass)) \quad (2)$$

Where, LH and LCRC respectively denote the MoCA header-length and the MoCA CRC length in Bytes; Nbasp and Nbass respectively denote the number of bits per OFDM symbol that can be transmitted on the primary and secondary channels using the chosen modulation profile.

Second, the number of Bytes, Mp and Ms, to be transmitted on the primary and secondary channels are determined in equation (9) and (10) below, based on the steps of first computing the number of RS-code blocks in the primary and secondary channels Brsp and Brss in equation (3) and (4); determining intermediate results Nmaxp and Nmaxs in equations (5) and (6); and determining the parameters of the last RS code word of both the primary and secondary channels respectively—(kp, np) and (ks,ns) in equations (7) and (8).

$$Brsp = ceil((Nas*Nbasp - 319)/(8*208)) \quad (3)$$

$$Brss = ceil((Nas*Nbass - 319)/(8*208)) \quad (4)$$

$$Nmaxp = floor(Nas*Nbasp/8) - (Brsp - 1)*208 \quad (5)$$

$$Nmaxs = floor(Nas*Nbass/8) - (Brss - 1)*208 \quad (6)$$

$[kp,np] = (32,40)$ if $Nmaxp < 74$ $(64,74)$ if $74 \leq Nmaxp \leq 140$ $(128,140)$ if $140 \leq Nmaxp < 208$ $(192,208)$ if $Nmaxp \geq 208$ \quad (7)

$[ks,ns] = (32,40)$ if $Nmaxs < 74$ $(64,74)$ if $74 \leq Nmaxs \leq 140$ $(128,140)$ if $140 \leq Nmaxs < 208$ $(192,208)$ if $Nmaxs \geq 208$ \quad (8)

$$Mp = (Brsp - 1)*192 + kp \quad (9)$$

$$Ms = (Brss - 1)*192 + ks \quad (10)$$

Third, the inequality of equation (11) is evaluated based on the values of Mp and Ms determined in (9) and (10).

$$Mt \leq Mp + Ms \quad (11)$$

If the inequality of (11) is determined to be true, the value of P which denotes the number of pad Bytes to be appended to the secondary stream is computed as per (12). If the inequality (11) is determined to be false, the value of Nas as computed in equation (2) of step 1, above is incremented by 1 and steps 2 and 3 comprising equations (3) through (11), are recomputed.

$$P = Mp + Ms - 2*(LH + LCRC) \quad (12)$$

The original payload-frame of length M 610a is then split into Mp 620a and Ms 630a Byte fragments as depicted in FIG. 6a. The primary fragment 620a is constituted of the primary channel MoCA header 621a, the primary channel payload subframe 622a and the MoCA CRC 623a. The secondary fragment 630a is constituted of the secondary channel MoCA header 631a, the secondary channel fragment 632a, the MoCA CRC 633a and the pad-bytes 634a as determined in (12).

The above embodiment represents a means of partitioning the data that leads to the optimal (minimum) amount of transmission time on the channel. It would be apparent to one skilled in the art that the iterative nature of the method above could be obviated lending to a simpler computation to determine the primary and secondary fragments at the expense of utilizing a non-optimal transmission time.

An EMoCA node may realize reliable transmission by several means. As per one embodiment of the present invention, the repetition of the packet on both primary and secondary channels is utilized. Consider the transmission of a data frame of M-Bytes. Due to the likely difference between the number of bits per OFDM symbol (Nbas) that can be transmitted on the primary and secondary channels—Nbasp and Nbass, it is required that the transmission with the larger Nbas be padded to ensure that equal number of OFDM symbols are transmitted on both primary and secondary channels. The transmission parameters are determined as per the steps below:

First, the number of OFDM symbols Nas to be is determined based on the smallest value of Nbas from the set spanning the primary and secondary channels {Nbasp, Nbass}, as per equation (17).

$$Nbas,smallest = min\{Nbasp, Nbass\} \quad (13)$$

$$Nbas,other = Nbas,smallest' \quad (14)$$

$$Mt = LH + M + LCRC \quad (15)$$

$L = 208*floor(Mt/192) + 0$ if $Mt$ mod $192 = 0$ $+40$ if $0 \leq Mt$ mod $192 < 32$ $+74$ if $32 \leq Mt$ mod $192 < 64$ $+140$ if $64 \leq Mt$ mod $192 < 128$ $+208$ if $Mt$ mod $192 \geq 128$ \quad (16)

$$Nas = ceil(L*8/Nbas,smallest) \quad (17)$$

Where, Mt represents the number of Bytes in the MoCA packet, L represents the number of FEC encoded Bytes to be transmitted.

Second, the number of pad-bytes to be transmitted on the other channel, Pother (having Nbas,other) is determined in equation (22):

$$Brs,other = ceil((Nas*Nbas,other - 319)/(8*208)) \quad (18)$$

$$Nmax,other = floor(Nas*Nbas,other/8) \quad (19)$$

$$[kother, nother] = (32, 40) \text{ if } Nmax, other < 74$$

$$(64, 74) \text{ if } 74 \leq Nmax, other \leq 140$$

$$(128, 140) \text{ if } 140 \leq Nmax, other \leq 208$$

$$(192, 208) \text{ if } Nmax, other \geq 208 \quad (20)$$

$$Ms, other = (Brs, other - 1) * 192 + kother \quad (21)$$

$$P = Ms, other - Mt \quad (22)$$

Where Brs,other represents the number of RS-code blocks; and [kother, nother] represent the parameters of the last RS code-word.

Figure 6:
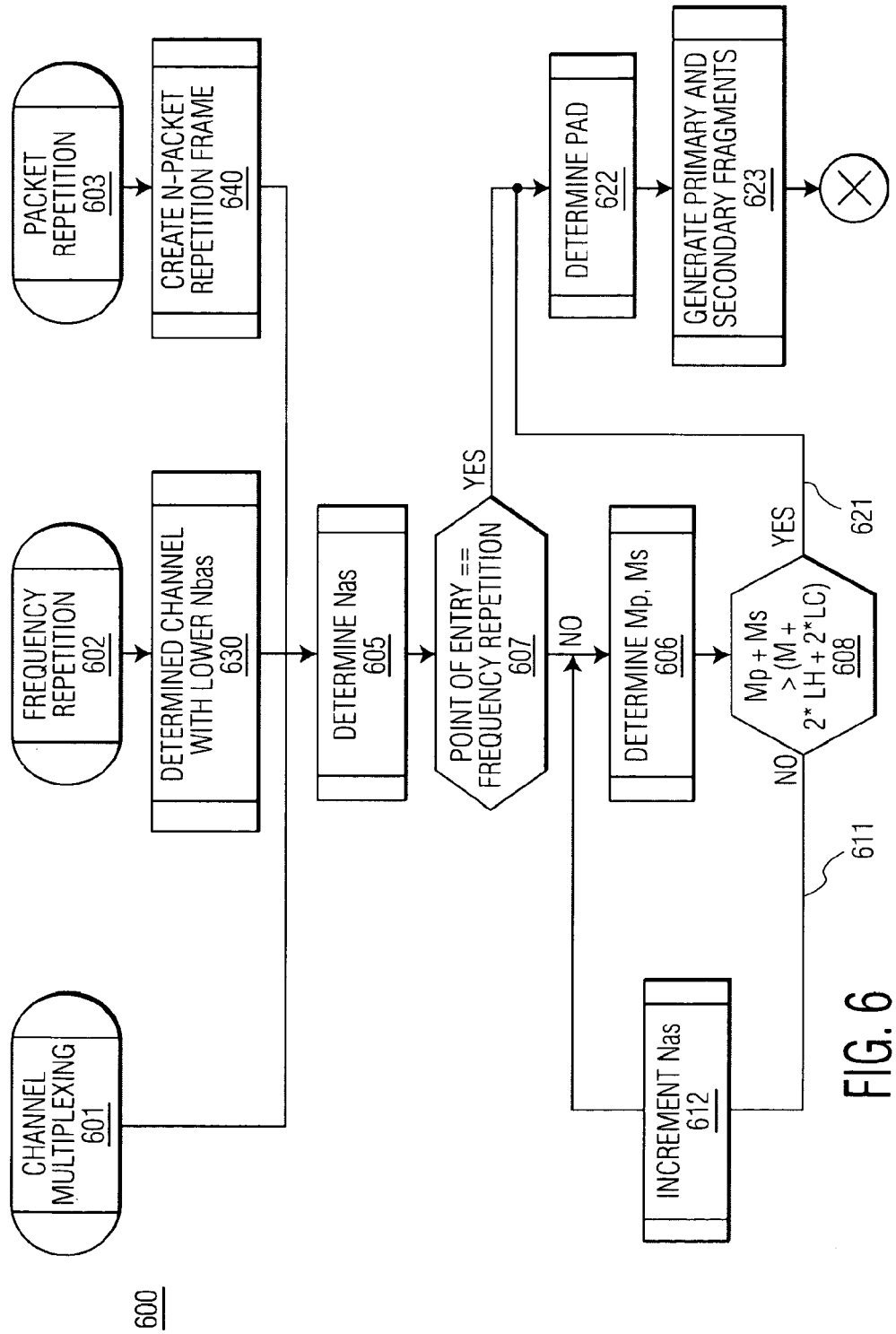
FIG. 6 is representative of the method of an EMoCA transmitter.
Figure 6A:
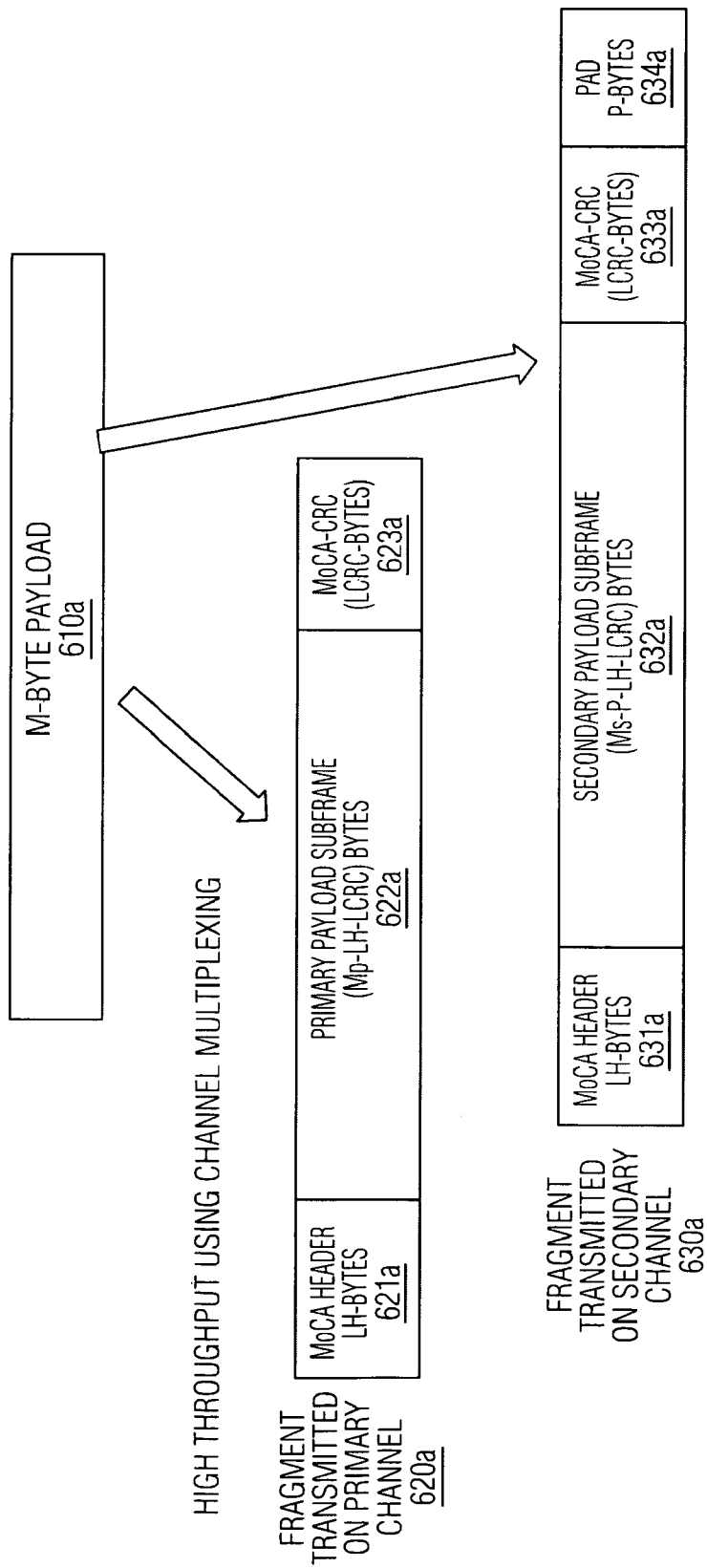
FIG. 6a depicts the process of fragmenting a payload across multiple channels for the purposes of high throughput EMoCA transmission using channel-multiplexing.
Figure 6B:
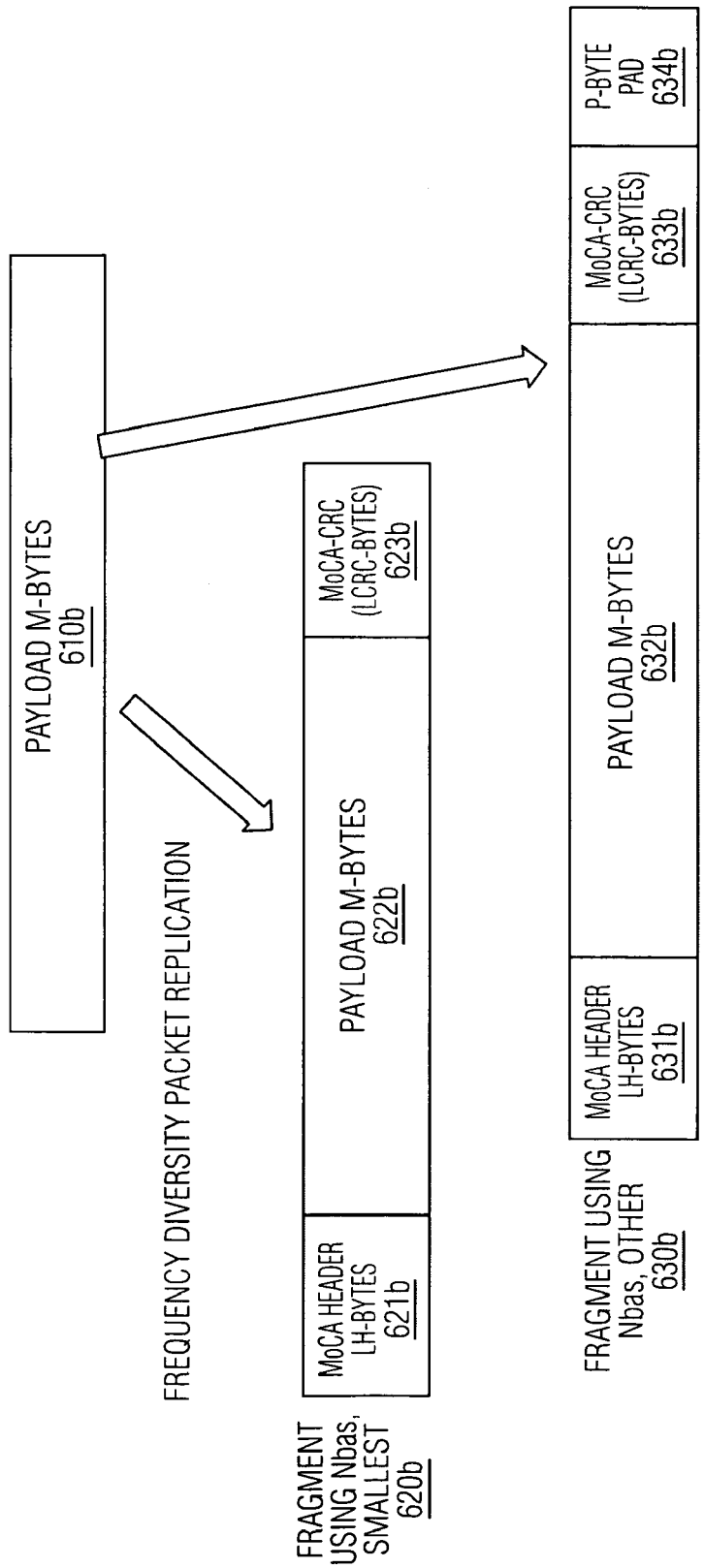
FIG. 6b depicts the process of fragmenting a payload across multiple channels for the purposes of reliable EMoCA transmission using frequency domain repetition.

Third the fragments to be transmitted on the primary and secondary channels are determined as shown in FIG. 6b. The fragment to be transmitted using Nbas,smallest 620b comprises of the MoCA header 621b, packet of length M 622b and MoCA CRC 623b. The fragment to be transmitted using Nbas,other 630b comprises of the MoCA header 631b, the packet of length M 632b, MoCA CRC 633b and pad of length P 634b.

Figure 6C:
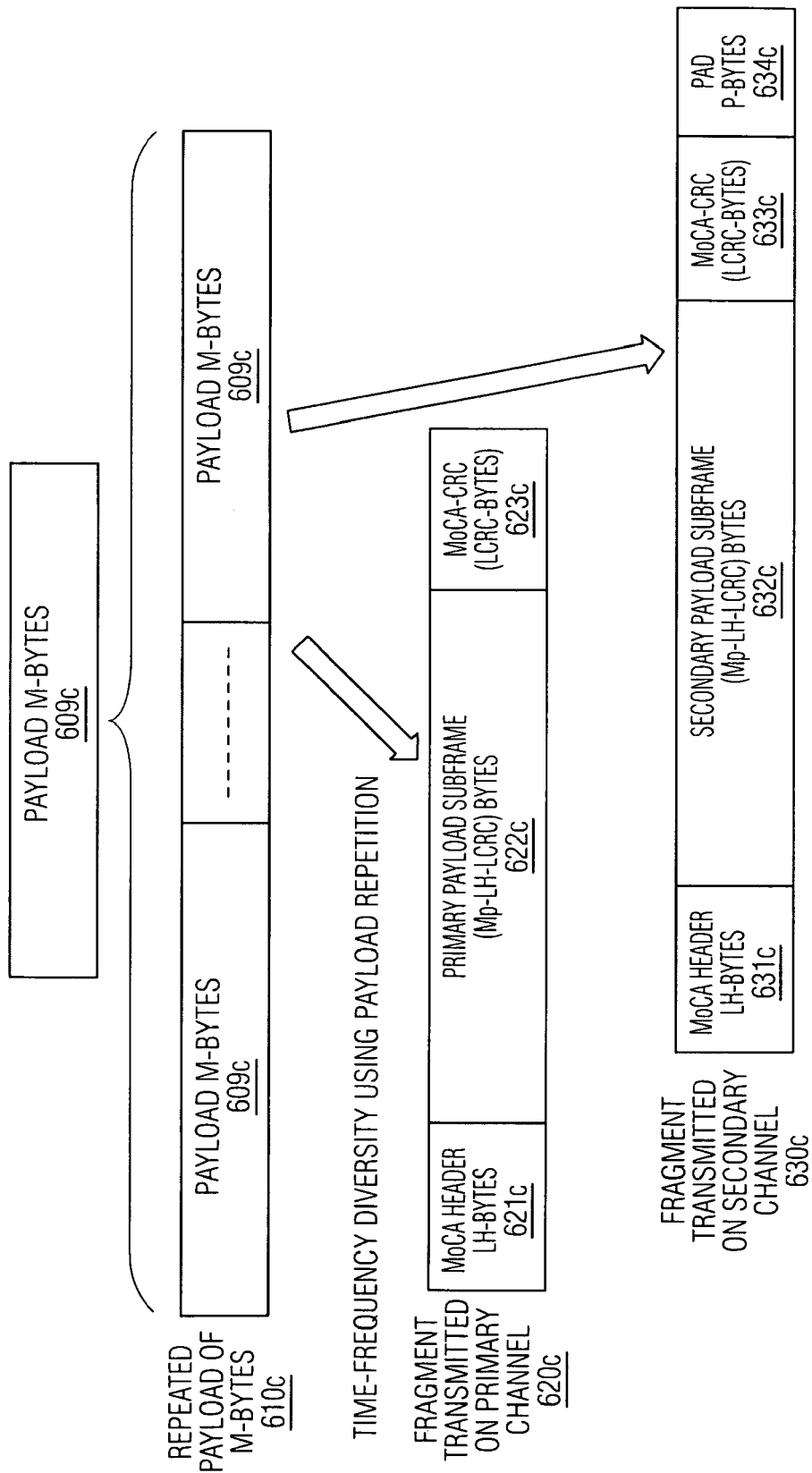
FIG. 6c depicts the process of fragmenting a payload across multiple channels for the purposes of reliable EMoCA transmission using payload repetition.

As per another embodiment of the present invention, an EMoCA node may realize reliable transmission by means of packet-repetition in time and frequency, as depicted in FIG. 6c. The data payload of m-Bytes 609c is repeated N-times to form a repeated payload of size M=N*m-Bytes 610c. The repeated frame may be transmitted using the method employed for channel multiplexing (steps encompassing (1) through (12)), where the fragment transmitted on the primary-channel 620c comprises of MoCA Header 621c, primary payload sub-frame 622c and MoCA CRC 623c and the fragment transmitted on the secondary channel 630c comprises of MoCA Header 631c, secondary payload sub-frame 632c, MoCA CRC 633c and Pad 634c. It would be apparent that the method of packet repetition as per the present embodiment is practicable by an EMoCA node with only primary channel capability as may be expected of low-cost, low capability EMoCA implementation.

FIG. 6 illustrates the method by which the embodiments of FIGS. 6a, 6b and 6c may be realized by an EMoCA transmitter. An EMoCA node attempting to transmit using a packet using channel multiplexing invokes process 601. As per the embodiments of the present invention, it first determines the number of OFDM symbols required as per step 605. In step 606, it determines Mp and Ms. Based on the evaluation of the inequality in 607, the transmitter adopts route 611 if it is determined a subsequent iteration is needed or route 621 if no further iteration is needed.

As per route 611, the transmitter increments the number of OFDM symbols determined in 605 in step 612 and re-evaluates step 606 in an attempt to satisfy the condition in 607.

As per route 621, the transmitter determines the number of pad-Bytes in 622 and splits the payload into primary and secondary channel fragments as in 623.

As per the methods embodied, a transmitter transmitting using the method of frequency-domain repetition as is illustrated in FIG. 6b, invokes process 602. It determines the channel with the lower Nbas 630 and uses this to compute the number of OFDM symbols 605 and the number of Pad-Bytes 622 based on which it generates the primary and secondary channel fragments in 623.

As per the methods embodied, a transmitter transmitting using the method of packet repetition as illustrated in FIG. 6c invokes process 603. It creates repeated frame in 640 and then follows the steps 605 and 606. On satisfying the condition 607, it follows route 621 and determines the pad bytes 622 and generates the primary and secondary channel fragments 623.

As per yet another aspect of this embodiment, an EMoCA node may realize extended range communications with another EMoCA node by making use of a modulation profile with a lower number of bits per OFDM symbol than determined during the modulation-profiling of the channel using Type-1 Probe transmissions in [1]. The usage of a more-robust modulation profile may be signaled on a per-frame basis through the reservation request using the unused values of bit-field PHY-PROFILE[5:0] field in the REQUEST ELEMENT as specified in [1]. Expanding on the encoding specified in [1], an EMoCA node shall encode the PHY-profile as follows. It is envisioned that the extended-range transmissions would be made to both to the primary as well as secondary channels, requiring that the extended-range communications mode be used between EMoCA nodes only. It would be apparent that the method of reduced constellation order transmission as per the present embodiment is practicable on an EMoCA node with only primary channel capability as would be expected of a low cost low capability EMoCA implementation. It is further envisioned that reduced constellation order transmission may be combined with any of the transmission schemes embodied in 600.

| PHY_PROFILE [5:0] | EMoCA Interpretation |
| --- | --- |
| 0x2 | Diversity Mode |
| 0x7 | Unicast Profile |
| 0x8 | Broadcast Profile |
| 0x17 | Unicast Profile using a constellation-order reduction of 1 bit per subcarrier; when the reduction of 1-bit from a given subcarrier results in a total number of bits on that subcarrier to be <=0, that subcarrier will not be used to transmit data. |
| 0x27 | Unicast Profile using a constellation-order reduction of 2 bits per subcarrier; when the reduction of 2-bits from a given subcarrier results in a total number of bits on that subcarrier to be <=0, that subcarrier will not be used to transmit data. |
| 0x37 | Unicast Profile using a constellation-order reduction of 3 bits per subcarrier; when the reduction of 3-bits from a given subcarrier results in a total number of bits on that subcarrier to be <= 0, that subcarrier will not be used to transmit data. |
| 0x18 | Broadcast Profile using a constellation order reduction of 1 bit per subcarrier; when the reduction of 1-bit from a given subcarrier results in a total number of bits on that subcarrier to be <=0, that subcarrier will not be used to transmit data. |
| 0x28 | Broadcast Profile using a constellation order reduction of 2 bits per subcarrier; when the reduction of 2-bits from a given subcarrier results in a total number of bits on that subcarrier to be <=0, that subcarrier will not be used to transmit data. |
| 0x38 | Broadcast Profile using a constellation order reduction of 3 bits per subcarrier; when the reduction of 3-bits from a given subcarrier results in a total number of bits on that subcarrier to be <= 0, that subcarrier will not be used to transmit data. |

As is evident from the description above, EMoCA nodes may transmit using one of several schemes. Central to realizing these benefits is signaling the receiver on how to decode the primary and secondary fragments in order to realize the benefits of the transmission scheme applied. The EMoCA_TX_SCHEME applied by the transmitter (and consequently to be applied by the receiver) may be indicated using the EMoCA MAC header transmitted on the secondary channel. Since the EMoCA MAC header follows the format of the MoCA MAC Header specified in [1], this signaling may be done by employing some of the bits marked RESERVED or UNUSED in the current MoCA header [1]. The EMoCA_TX_SCHEME may also be transmitted on the primary channel.

Figure 7:
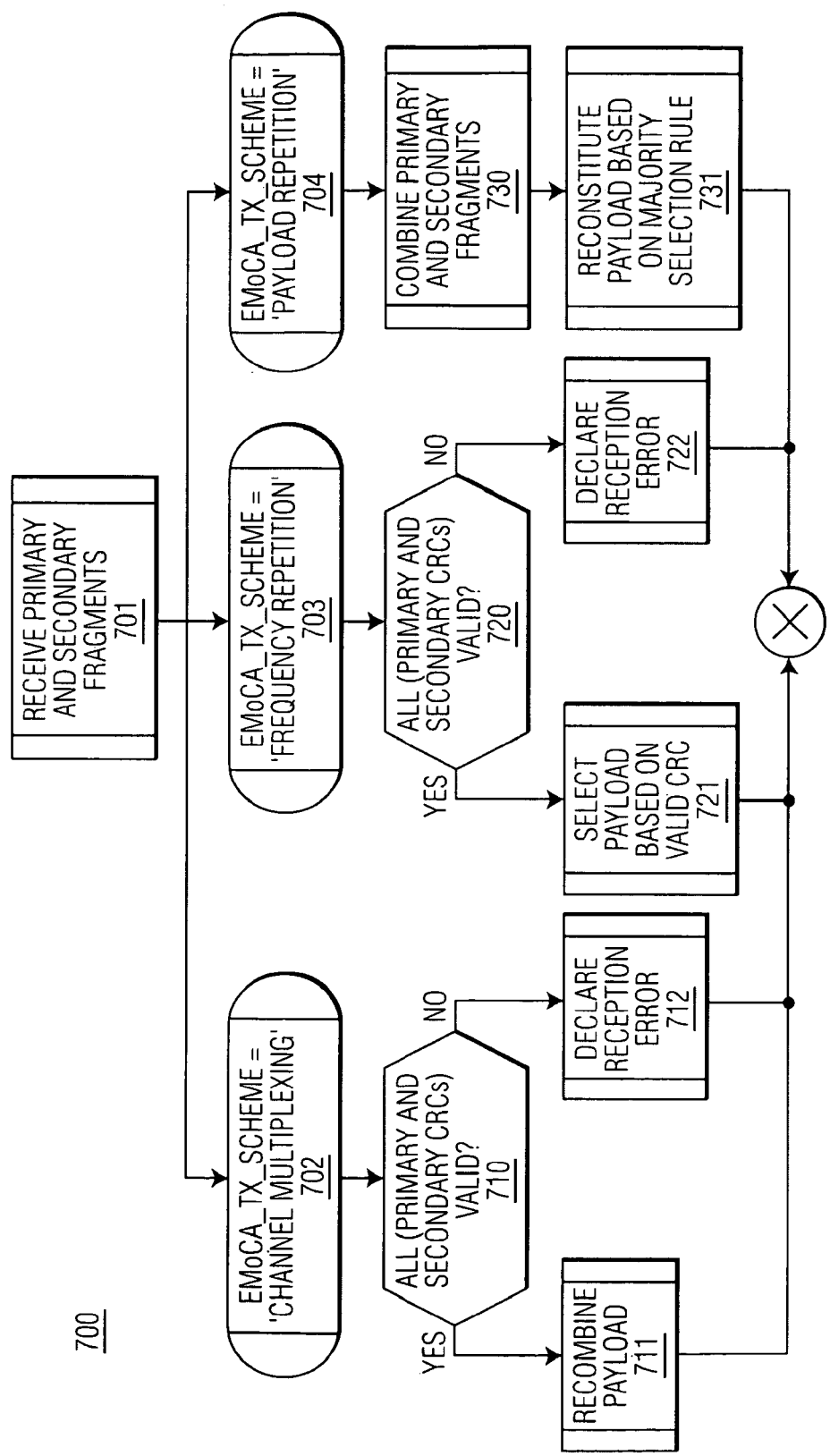
FIG. 7 is representative of the method of an EMoCA receiver.

An EMoCA receiver receiving a high-data rate EMoCA transmission determines the number of OFDM symbols to be received on the primary and secondary channels from the MAP-frame and appropriately configures the primary and secondary receivers for reception. Based on the actual length of the primary and secondary fragments (as determined from the MoCA MAC header while receiving the fragments), the EMoCA-node determines the length of the pad as well as the FEC-coding as per the methods of [1]. On completing the reception of both the primary and secondary fragments, the EMoCA-node combines the packet as per the flowchart of FIG. 7.

The EMoCA receiver implementing the methods of 700 interprets the EMoCA_TX_SCHEME field from the received transmission in step 701. If the EMoCA_TX_SCHEME is determined to be 'channel-multiplexing', process 702 is invoked whereby the MoCA-CRCs on the primary and secondary channels—623a and 633a being determined as valid in step 710, the primary and secondary channel payload subframes 622a and 623a are combined in 711 to reconstitute the payload 610a.

Likewise, on determining the EMoCA_TX_SCHEME field from a received transmission to be 'frequency repetition', the EMoCA receiver invokes process 703. The MoCA CRCs on the primary and secondary channels—623b and 633b are evaluated and if any of them are determined valid in step 720, the corresponding payload 622b or 632b is returned.

Likewise, on determining the EMoCA_TX_SCHEME field from a received transmission to be 'packet repetition by a factor of N', the EMoCA receiver invokes the process of 704. The MoCA CRCs 623c and 633c are ignored and the receiver combines the primary and secondary payload subframes 622c and 632c in step 730, using a 'majority decision over N-rule' to determine the bits of the transmitted payload 609c as per step 731.

Figure 8:
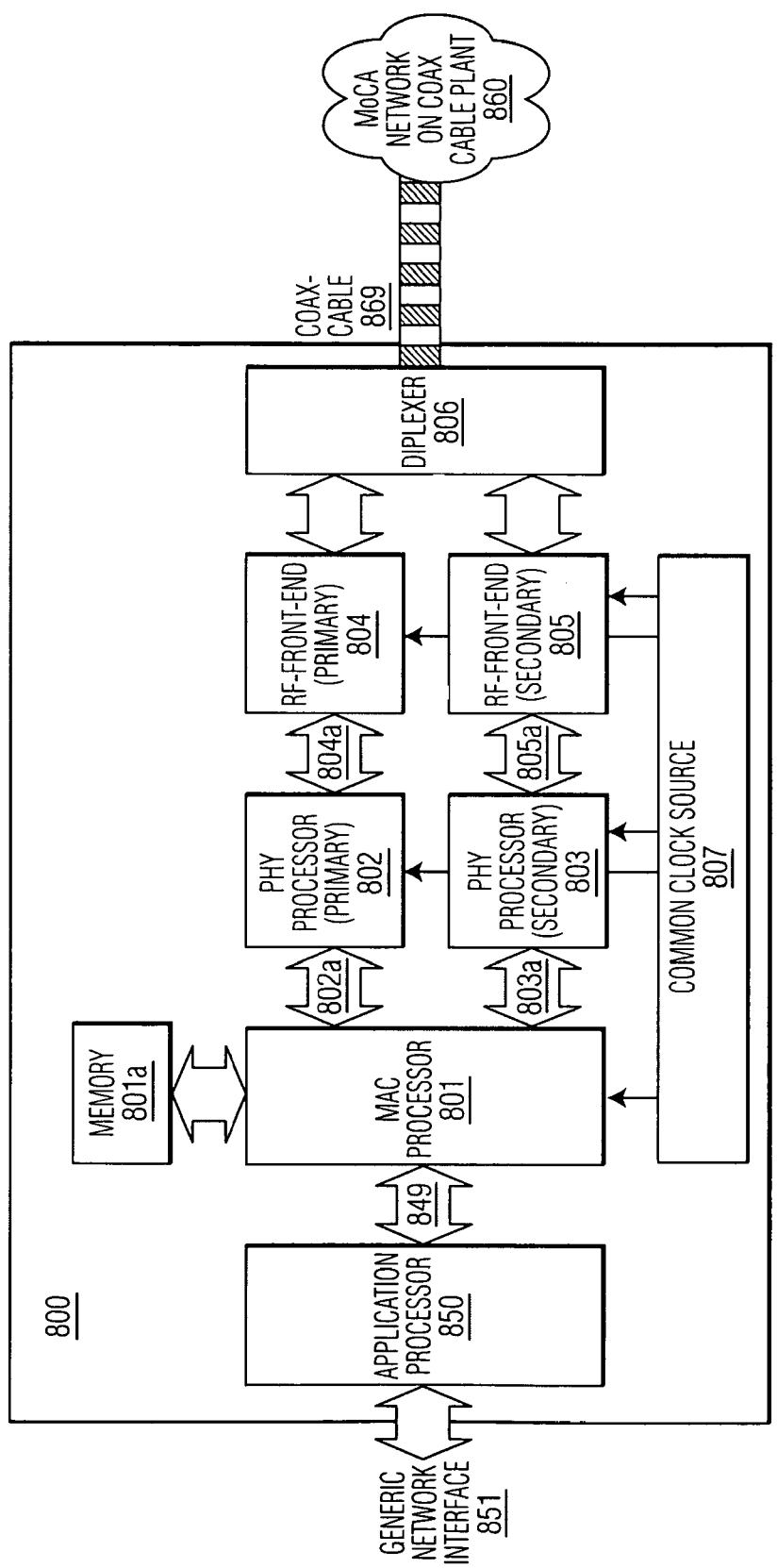
FIG. 8 is a block diagram illustrating the functional units of an EMoCA node.

FIG. 8 represents an exemplary implementation of an EMoCA-node 800 that is capable of bridging EMoCA transmissions received over the coax cable-plant 860 to an application processor 850 over means of an interface 849. Like in [1], EMoCA nodes where the application processor 850 exposes a generic network interface 851 such as Ethernet, PCIe, USB, WLAN or any other network interface for the purpose of bridging data from said interface 851 over the coax cable plant 860, are called 'intermediate devices'. Also, like in [1], EMoCA nodes where the application processor 850 serves as a source and/or sink for data transmitted/received over the coax-cable plant 860 are called 'terminal-nodes'.

The EMoCA-node 800 comprises of a MAC-processor 801 connected to memory 801a, a primary-PHY-processor 802 and a secondary-PHY-processor 803 for operation on the primary and secondary channels respectively. 802 and 803 are connected to their respective front-ends—804 and 805 which interface to the coaxial-cable-plant 860 over a single-coaxial cable 869 through means of a diplexer 806. In keeping with the requirements of EMoCA for synchronous transmission across both channels, all components of the EMoCA-node 800 derive their clocks from a common clock source 807. Further, 802 and 803 are connected to 801 over interfaces 802a and 803a that are capable of independent parallel operation scheduled and controlled by 801.

In order to transmit a packet using EMoCA, the MAC-processor 801 is responsible for performing the steps of: (1) receiving the data to be transmitted by the application-processor 850; (2) buffering it in memory 801a; (3) partitioning it into the primary and secondary streams as may be performed by the method embodied in 600; (4) generating a RR-frame and transmitting it to the NC; (5) interpreting the MAP-frame from the NC and scheduling the synchronous transmissions of the primary and secondary streams through the PHY-processors 802 and 803 at the transmission-time specified in the received MAP-frame.

In order to transmit a packet using EMoCA, the PHY-processors 802 and 803 are responsible for receiving their respective streams from the MAC-processor 801, performing the steps of FEC-encoding, OFDM modulation (using their respective PHY-profiles) and transmitting the output signals over interfaces 804a and 805a to the front-ends 804 and 805 which convert the digital bit-stream from the PHY-processors to their respective RF-channel and feed their output to the diplexer which combines the primary and secondary RF-signals onto a single coax cable In order to receive a packet using EMoCA, the MAC processor is responsible for performing the steps of: (1) computing the receive parameters of the primary and secondary channels based on the duration information contained in the MAP-frame; (2) scheduling the PHY-processors 802 and 803 to enable reception of the primary and secondary-streams using the computed parameters at the receive-time specified by the MAP-frame; (3) receive the primary and secondary-streams from 802 and 803, respectively and storing it in 801a; (4) receiving status information associated with the packet reception from 802 and 803; (5) combining the primary and secondary streams received from 802 and 803, as may be performed by the method embodied in 700; (6) transmitting the combined packet to the application processor 850.

In order to receive a packet using EMoCA, the PHY-processors 802 and 803 are responsible for enabling the front-ends for reception, receiving the down-converted primary and secondary streams from 804 and 805 respectively, demodulating and decoding them based on their respective PHY-profiles and parameters and transmitting them to 801 over interfaces 802a and 803a, respectively.

Additionally 801 may use information obtained from 802, 803, 804 and 805 during transmission and reception to compute link statistics such as signal-quality, channel quality, power-level etc. as would be apparent to one skilled in the art. The information computed by 801 may also be used for instance to generate transmit-power control information which is fed-back to improve link-performance, among other applications as would be apparent to one skilled in the art.

In order to facilitate the objective of transmission and reception using EMoCA, the PHY-processors 802 and 803 are further responsible for generating probes and probe reports in accordance with the teachings embodied above.

Based on the embodiment of the apparatus for an EMoCA node described above, it would be apparent to one skilled in the art that the functional units described above may be implemented as dedicated hardware or software running on an embedded processor. Moreover several realizations may exist with the functions of the MAC-processor implemented on a dedicated network processor or being distributed among several embedded processors. Further, depending on the level of integration, the EMoCA node described above may be implemented as one or as several integrated-circuits. It is understood that all such variations of an EMoCA node fall within the purview of the present invention.

In order to facilitate the ease of deployment of EMoCA technology, EMoCA was developed as being fully backwards with legacy MoCA technology enabling both mixed as well as green-field networks. Further, to keep the development costs low, EMoCA nodes may be constructed using components used for legacy MoCA-nodes as discussed in the ensuing embodiment.

Figure 9:
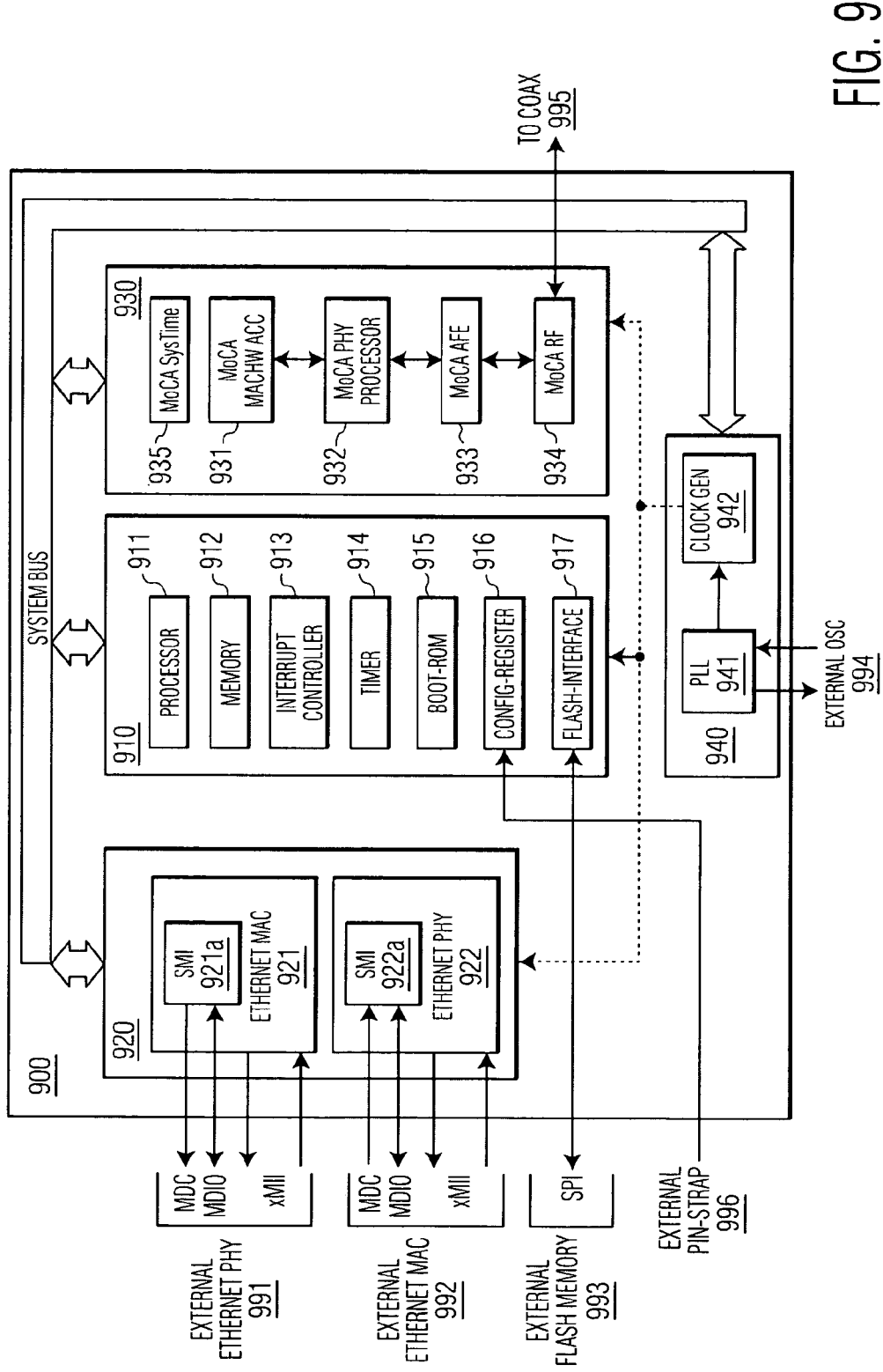
FIG. 9 is an exemplary realization of a MoCA node.

FIG. 9 below describes an exemplary architecture of a legacy MoCA device 900 which is used as a building block of an EMoCA node as per an aspect of this embodiment. 900 comprises of a processor subsystem 910, a host-interface subsystem 920, a MoCA subsystem 930 and a clock subsystem 940. The processor sub-system 910 comprises of a processor 911, memory 912 as well as common-peripheral devices such as an interrupt-controller 913, timer-unit 914, boot-ROM 915, configuration register bank 916 and flash-interface 917. The Host-Interface Sub-system contains both an Ethernet-MAC 921 and an Ethernet-PHY 922 interface, allowing among other product configurations—(1) the device 900 to be configured as a standalone Ethernet-bridge by connecting 921 to an external Ethernet-physical-layer 991; or (2) in an embedded application where 900 connects to an application device 992 over 922. 921 and 922 also contain their respective SMI-interfaces 921*a*—an SMI Master, and 922*a*—an SMI Slave. The MoCA sub-system 930 comprises of a MoCA MAC hardware accelerator 931 which connects to a MoCA baseband PHY processor 932 which in turn drives an analog-front-end 933 and an RF-front-end 934 which connects to the coax-cable plant via 995. 930 also contains the system-time clock 935 which is updated periodically by the time-stamp from an NCs transmission and maintains the system-time at the MoCA node. The clock and reset subsystem 940 contains a PLL 941 which generates a clock based on an external crystal oscillator 994, from which are derived all the clocks required by the modules of 900.

The SMI Slave Interface 922*a* contains a set of 32 registers, each 16 bits-wide, as specified in the IEEE 802.3 Specification (identified herein as [3]). Of these, 16-registers are defined in [3] while the other 16-registers are left as 'vendor-specific'. One of the vendor-specific registers is called the MoCA-System-Time register and is mapped directly to the MoCA-System-Timer 935, allowing for a write to that register to reflect as an update to the time maintained by 935. Yet another vendor specific register—PLL Status register reflects the status of the PLL 941—locked or un-locked.

When the system is powered up, the clock generator 941 supplies the clock from the external oscillator 994 to the processor which starts executing code contained in the boot-ROM 915. It determines the 'product-configuration' from the configuration register 916 which latches its value from an external interface such as a pin-strap 996 at startup. The processor programs the clock generator 942 to enable the appropriate peripheral clocks at their respective frequencies depending on product configuration. For example, while the MoCA PHY-clock is determined by [1] and is constant, some product configurations may require higher processing power thus requiring the processor to be correspondingly clocked at a higher frequency than others. On acquiring a PLL-lock from 941, the processor configures 942 to switch the system to the higher frequency PLL-clock and initiates the downloading of firmware into memory 912 leading to system boot-up. As would be apparent, to one skilled in the art, several options may be used for boot-up and these may be determined based on product configuration. Based on the example of 900, two possible boot scenarios are: (1) boot over Ethernet—exploiting the download of code over one of the host-interfaces in 920; or (2) boot over flash using 917 to access code stored in external flash-memory 993.

In steady-state, the processor 911 coordinates the transmission and reception of packets over the various interfaces—Ethernet-MAC 921, Ethernet-PHY 922 and MoCA/coax 930 through the use of data-structures known as descriptor-queues that are setup at designated areas in memory 912. There is one descriptor-queue corresponding to each interface that is capable of operation in parallel with another—for example the Ethernet PHY or MAC interfaces—921, 922 would support two descriptor queues each, one for transmit and one for receive; while the MoCA MAC hardware accelerator 931 would support a single descriptor queue since the MoCA interface is half-duplex in nature. Additionally, all packets are stored in memory 912.

Each frame that is received from any interface 921, 922 or 930 has an associated descriptor in the descriptor queue containing the following information:

```
RxPacketDescriptor :=
    {
        packet location in memory,
        packet-length,
        parameters to be used during reception,
        status of reception
    }
```

Depending on the interface, it is likely that some of these fields are required prior to reception (eg: parameters to be used during reception) and some are determined after reception (eg: status during reception), resulting in an update to the descriptor.

Likewise each frame that is transmitted from any interface 921, 922 or 930 is described by an associated descriptor in the descriptor queue containing the following information:

```
TxPacketDescriptor :=
    {
        packet location in memory,
        packet length,
        parameters to be used during transmission,
        status of transmission
    }
```

Depending on the interface, it is likely that some of the fields of the descriptor are required prior to transmission (eg: packet location in memory, packet-length and parameters to be used during transmission) and some determined after transmission (eg: transmission status).

In order to bridge a packet from the host-interface to the coax-interface, among other protocol functions described in [1] and [2], the firmware running on 900 performs the steps of: (1) creating a descriptor for the host-interface 921 and/or 922 to receive a packet; (2) generating an RR and its associated descriptor in 912 for the packet received in step (1); (3) processing the MAP-frame received by 930 in response to the transmitted RR-frame to determine when to transmit the packet received in (1); (4) creating a descriptor for 930 to transmit the packet received in step (1) at time determined from the MAP-frame in step (3).

Likewise, in order to bridge a packet from the coax-interface to the host-interface, among other protocol functions described in [1] and [2], the firmware running on 900 performs the steps of: (1) creating a descriptor to facilitate 930 to receive a MoCA-frame using the parameters and time determined from the previously received MAP-frame; (2) on reception of the packet by 930 into 912 in step (1), creating a descriptor to transmit it on the appropriate host-interface in 920.

Figure 10:
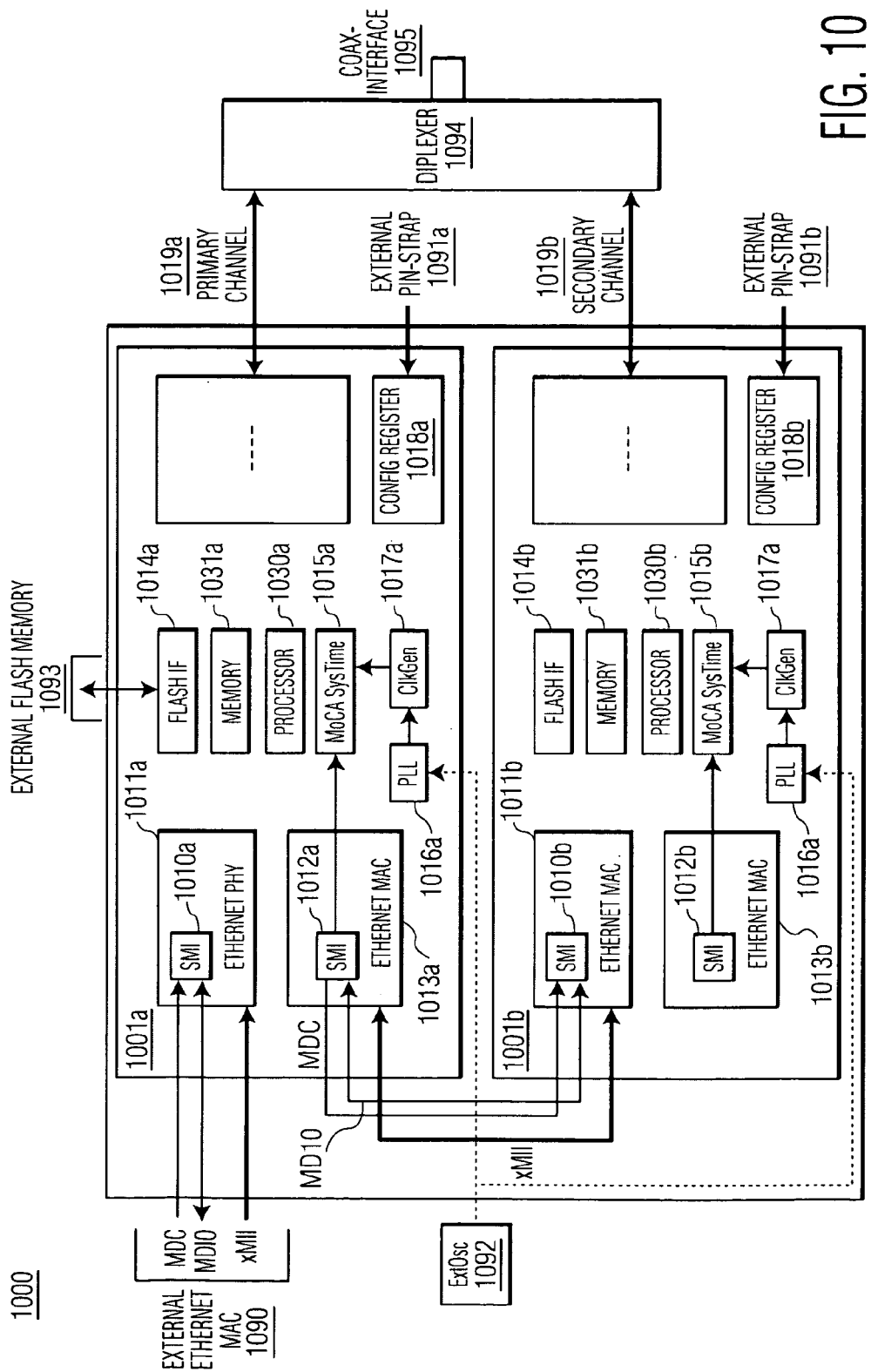
FIG. 10 is exemplary of an EMoCA node constituted of MoCA nodes.

FIG. 10 embodies a realization of an EMoCA-node 1000 capable of using one primary and one secondary channel. The EMoCA node is constituted of two instances of a MoCA-device as embodied in 900—Primary 1001a and Secondary 1001b. Both 1001a and 1001b are connected to a common oscillator 1092 as shown in the Figure. In a deployment scenario where the EMoCA node boots from flash memory, the flash-interface 1014a connects to a flash device 1093.

Internally, the Ethernet-MAC interface 1013a of 1001a connects to the Ethernet PHY interface 1011b of 1001b. Also, the SMI-interface 1012a of the Ethernet MAC interface 1013a in device 1001a connects to the SMI-interface 1010b of the Ethernet-PHY interface 1011b of 1001b.

The configuration registers—1018a and 1018b derive their values from external pin-straps 1091a and 1091b, respectively. The Primary and Secondary RF-connections 1019a and 1019b connect to a diplexer 1094 which interfaces to the coax cable plant over connector 1095. The Ethernet PHY-interface 1011a and the SMI-interface 1010a of 1001a may be connected to an application processor 1090 which interfaces to 1000 using an Ethernet MAC interface.

When the EMoCA node 1000 powers-up, both 1001a and 1001b receive a common reference clock from 1092. As described in the context of 900, the clock generators 1016a and 1016b supply the reference clock to the processor in 1001a and 1001b, which execute their respective boot-ROMs. The processor 1030a determines 1001a's 'product-configuration' to be:

```
ProductConfigurationInformation~1001a :=
    {
    EMoCA device,
    Primary-channel with one secondary-channel,
    Boot-method
    Processor Frequency Configuration
    }
``` from the configuration register 1018a that latches the pin-strap value 1091a. Likewise, the processor 1030b determines 1001b's configuration to be

```
ProductConfigurationInformation~1001b :=
    {
    EMoCA device,
    Secondary-channel #1 of 1 secondary channels
    Boot-method
    Processor Frequency Configuration
    }
```

The configuration register set information depicted above is meant to describe the minimum amount of information required for EMoCA operation. It is understood that in actuality the configuration registers 1018a and 1018b may contain additional fields. It is further understood that some of the information contained in the processor-configuration description above may be implicit from other parameters—for instance the processor frequency configuration may be determined a-priori for both primary and secondary devices and encoded as part of the boot-ROM, thus not requiring this information to be part of the configuration registers 1018a and 1018b. Likewise, 1001b when configured as a secondary channel device, may be constrained to boot from the primary device 1001a.

The processor 1030a executing code in its boot-ROM, on detecting its PLL 1016a as locked, configures its clock generator 1017a to enable the clocks to the appropriate modules at their appropriate frequencies based on the product configuration information in 1018a. Correspondingly, 1030b on detecting 1016b as locked configures 1017b to enable the appropriate modules at their appropriate frequencies based on the product configuration information in 1018b. Based on the setup of 1000, 1001b can disable power to 1013b, 1012b and 1014b thereby resulting in power efficient operation. Thus, individual modules of the component MoCA-devices 900 (referred as 1001a and 1001b) in the EMoCA node 1000 may be gated or powered-down based on product configuration, thereby resulting in power-efficient operation of the EMoCA-node.

Further, as will become apparent through subsequent description of the present embodiment, the firmware-load on the processor of 1030a and 1030b may be different. It is a further aspect of this embodiment that depending on the product configuration in 1018a and 1018b, the processor-subsystems of 1001a and 1001b are clocked differently resulting in power-efficient operation of the EMoCA device.

As stated in a previous embodiment of the present invention, key to realizing an EMoCA device is the synchronization of the transmissions from the primary and secondary channels. Central to this is the synchronization of the system-timers 1015a and 1015b as maintained in 1001a and 1001b. While PLLs 1016a and 1016b are driven by the same reference clock 1092 resulting in their having a common frequency once locked, the difference in their lock-times and the corresponding 'early arrival' of the clock from one of the clock generators 1017a or 1017b to the MoCA System Time Counter 1015a or 1015b would result in an offset in the system-times as maintained and used by the primary and secondary channels.

To overcome this problem, an aspect of this embodiment calls for the processor 1030a on determining its PLL 1016a has locked, to determine that the PLL 1016b of 1001b has locked by reading the status in the PLL Status Register maintained in 1010b using its SMI-Master interface 1012a. On determining both PLLs 1016a and 1016b as locked, the processor of 1030a writes a synchronization command over its SMI-Master interface 1012a to the MoCA System Time Register 1015b as exposed through the SMI-Slave interface 1010b. The synchronization command-word accounts for the latency in accessing 1015b over 1012a and 1010b such that on conclusion of the synchronization process, both 1015a and 1015b reflect the same system-time.

The boot-ROM of 1001a then initiates the downloading of firmware prior to complete the boot-up process. As described previously in the context of 900, the EMoCA device may boot-up using a variety of options. As per one product configuration, the Primary-device 1001a could be connected to an external flash-memory device 1093, containing the firmware image. 1001a may initiate a code download to memory 1031a and then transfer the image over, for instance, the Ethernet interface 1013a to 1001b through 1011b. As both primary and secondary channels have different functions to perform, it is understood that the firmware image executed on 1001a and 1001b may be different.

Alternately, instead of using flash-memory 1093, the EMoCA node 1000 may obtain its firmware image from an application processor 1090 using interface 1011a. Internally code may be transferred to 1001b, as described above.

As per an aspect of this embodiment, an EMoCA-node 1000, on receiving a packet to be transmitted over the EMoCA network from 1090 stores the packet in memory 1031a. 1030a then executes the method of embodied in 600 to determine the length of the primary and secondary fragments. 1030a then generates a RR-frame corresponding to the duration of the EMoCA transmission and an associated descriptor for transmitting the RR on the coax interface. 1030*a* also generates descriptor for transmitting the following information to 1001*b*.

```
SecondaryFragmentTxInformation :=
    {
        FRAME_SUBTYPE
        FRAME_TYPE
        DESTINATION
        PHY_PROFILE
        REQUEST_ID
        PROBE_INDEX (if transmission is a probe)
        Secondary-fragment including any associated pad as
            determined by the method of
            600 (if data/control frame)
    }
```

1001*b* receives the information transmitted above and stores it in 1031*b*.

On receiving the MAP-frame from the NC, the processor 1030*a* immediately schedules its transmission to 1001*b* over interface 1013*a*. Both 1030*a* and 1030*b* process the MAP-frame independently and create descriptors for the transmission of the primary and secondary fragments at the time stipulated for the corresponding frame in the MAP-frame. By virtue of the fact that both 1015*a* and 1015*b* are synchronized as previously described, transmissions on 1019*a* and 1019*b* occur simultaneously, resulting in an EMoCA multi-channel transmission on the coax cable 1095.

As discussed above, on receiving a MAP-frame from the NC, the processor 1030*a* immediately schedules its transmission to 1001*b* over interface 1013*a*. In the case of a packet to be received from another EMoCA node both primary and secondary channel devices 1001*a* and 1001*b* schedule reception of their corresponding packet fragments using the parameters contained in the MAP-frame and the method described in [1]. Upon completing reception of an EMoCA transmission the secondary-device 1001*b* schedules transmission of the following information to 1001*a* over the interface 1011*b*:

```
SecondaryFragmentRxInformation :=
{
SRC from MAP-frame,
REQUEST ID from MAP-frame,
Secondary-fragment stripped of any pad-bits as received over 1019b
Secondary-fragment reception status
EMoCA_TX_SCHEME
}
```

The primary device 1001*a* receives the packet over 1013*a* and stores it in 1031*a*. The processor 1030*a* then recombines the packet as per the steps embodied by the method of 700. 1030*a* then schedules the transmission of the packet to the application 1090 over its interface 1011*a*. In the event of an error while receiving a secondary fragment, 1001*b* may substitute the Secondary-fragment field in the SecondaryFragmentRx-Information above with a NULL, so as to eliminate wastage of resources in transferring an errored frame from 1001*b* to 1001*a*.

As would be apparent to one skilled in the art, the MoCA System Timers 1015*a* and 1015*b*, though synchronized with one another may drift with respect to the NCs System-timer over time. In order to maintain synchronism, the EMoCA device 1000 periodically updates the System-Time maintained by the primary and secondary devices 1001*a* and 1001*b* in 1015*a* and 1015*b*, as per the following steps: (1) On receiving a transmission from the NC, the MoCA subsystem of 1001*a* logs a time-stamp of the packet received from the timer 1015*a*; (2) Based on this time-stamp, 1030*a* computes the offset of 1015*a* with respect to the NCs transmission-time of the packet (as contained in the packet header); (3) 1030*a* schedules an update to 1015*a* and 1015*b* at a time when there is no transmit/receive activity as scheduled by the NC through the MAP-frame; (4) The schedule (specified below) is communicated to 1001*b* via the interface 1013*a*; (5) Both 1015*a* and 1015*b* are updated simultaneously with the offset, realigning them to the NCs system-time.

```
ResyncSystemTimerCommand :=
    {
        Offset with respect to NC System-time
        Time to apply offset to Local System time
    }
```

While certain embodiments of the inventions have been described above, it will be understood that the embodiments described are by way of example only. Accordingly, the inventions should not be limited based on the described embodiments.

What is claimed is:

1. An apparatus for communicating multimedia data between nodes over coaxial cable, wherein the nodes are connected via a coaxial cable network, the apparatus comprising:
    a plurality of devices, with each device of the plurality of devices being operable to communicate over a single communications channel, wherein:
        the plurality of devices is inter-connected such that a primary device in the plurality of devices interfaces to an application processor via one interface and interfaces to a secondary device in the plurality of devices via another interface;
        the primary device communicates over a primary channel;
        the secondary device communicates over a secondary channel; and
        clocks of the primary and secondary devices are derived from a same reference source; and
    a combiner that is operable to interface network outputs of the primary and secondary devices to same network media.

2. The apparatus of claim 1 wherein the primary and secondary devices are synchronized by performing the steps of:
    polling by the primary device the status of the phase-locked loop of the secondary device via means of an inter-device interface; and
    writing by the primary device, on determining the phase-locked loop of all primary and secondary devices as locked, a synchronization word to its own time-counter as well as to the time counters of the secondary devices over an inter-device interface, the synchronization word written to the secondary devices accounting for a predetermined latency difference between the primary device accessing its internal time-counter and the primary device accessing the time-counter of the secondary devices over the inter-device interface.

3. The apparatus of claim 1 wherein the apparatus can be booted by having the primary device perform the steps of:
    accessing the firmware image from an external source and storing it in memory;
    transferring the boot-code to the secondary devices via the inter-device interface; and
    signaling the secondary devices on completion of the transfer of boot-code via the inter-device interface.

4. The apparatus of claim 1 further configured to transmit a packet using both the primary and secondary channels by having the primary device perform the steps of receiving the payload to be transmitted from the application processor; conditionally on the transmission scheme in use, determining the primary and secondary fragments to be transmitted on the primary and secondary channels respectively; sending a reservation request to the network coordinator for the determined transmission; transmitting the secondary fragments transmit-information to the secondary devices over the inter-device interface; and on receiving the schedule information from the network controller, forwarding said schedule information to the secondary devices over the inter-device interface; and by both the primary and secondary devices decoding the schedule information and transmitting their respective primary and secondary fragments over the network media through means of the combiner.

5. The apparatus of claim 1 wherein the secondary channel transmit information transmitted by the primary device to the secondary devices prior to a frame transmission comprises tag information by which a secondary device may associate said secondary channel transmit information to the schedule received from the primary device via inter-device interface; transmit parameters to be used for transmission of associated fragment; fragment to be transmitted on secondary channel; and pad information to be transmitted on said secondary channel.

6. The apparatus of claim 1 wherein the apparatus is configured to receive a packet over both primary and secondary channels by forwarding by the primary device the schedule information to the secondary devices via the inter-device interface, on receiving schedule information broadcast by the network controller; receiving by both primary and secondary devices their respective primary and secondary fragments over their respective primary and secondary channels in accordance with the schedule received by the primary device and forwarded to the secondary devices; transmitting by the secondary devices fragment receive-information to the primary device; determining by the primary device the transmission scheme used and appropriately combining the secondary payload fragments with the primary payload fragment as per the embodiments described herein to determine the originally transmitted payload; and transmitting by the primary device the payload to the application processor via the appropriate interface.

7. The apparatus of claim 1 wherein the secondary channel receive information transmitted by the secondary devices to the primary device after receiving a secondary fragment can comprise tag information by which the primary device may associate said secondary channel receive information to the schedule received from the network coordinator and the primary fragment as received by the primary device; payload of fragment received over the secondary channel; secondary fragment reception status; transmission scheme used by transmitter to transmit packet, as determined from secondary fragment header.

8. The apparatus of claim 1 wherein the apparatus is configured to resynchronize the system-timers of the primary and secondary devices with respect to the system-time determined from a frame received from the network controller by having the primary device determine the offset of its local system-timer with respect to a transmission received from a control node by comparing the time-stamp of its reception with the network controller's system time contained in a frame received from the network controller; determine a safe-instant to apply offset, such safe instant corresponding to no scheduled transmit/receive activity for the node as determined from the schedule received from the network coordinator over the primary channel; transmit the determined offset as well as safe-instant as determined above, to the secondary devices via an inter-chip interface; and by having both primary device and secondary devices apply the determined offset to their respective time-counters at determined safe-instant.

\* \* \* \* \*